US009955466B2

United States Patent
Papasakellariou et al.

(10) Patent No.: US 9,955,466 B2
(45) Date of Patent: Apr. 24, 2018

(54) ADAPTATION OF CONTROL SIGNALING TRANSMISSIONS TO VARIATIONS IN RESPECTIVE RESOURCES

(71) Applicant: Samsung Electronics Co., Ltd., Suwon-si, Gyeonggi-do (KR)

(72) Inventors: Aris Papasakellariou, Dallas, TX (US); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/865,910

(22) Filed: Sep. 25, 2015

(65) Prior Publication Data
US 2016/0014752 A1 Jan. 14, 2016

Related U.S. Application Data

(63) Continuation of application No. 13/777,396, filed on Feb. 26, 2013.
(Continued)

(51) Int. Cl.
*H04W 72/04* (2009.01)
*H04L 5/00* (2006.01)
*H04W 88/02* (2009.01)

(52) U.S. Cl.
CPC ......... *H04W 72/042* (2013.01); *H04L 5/0007* (2013.01); *H04L 5/0053* (2013.01);
(Continued)

(58) Field of Classification Search
CPC ............... H04W 72/042; H04W 88/02; H04W 72/0446; H04W 72/04; H04L 5/0007;
(Continued)

(56) References Cited

U.S. PATENT DOCUMENTS

2009/0175245 A1 7/2009 Harada et al.
2009/0316593 A1 12/2009 Wang et al.
(Continued)

FOREIGN PATENT DOCUMENTS

CN 102164416 A 8/2011
EP 2034757 A1 3/2009
(Continued)

OTHER PUBLICATIONS

Liao, May 5, 2011, U.S. Appl. No. 61/482,822, pp. 1-24.*
(Continued)

*Primary Examiner* — Lakeram Jangbahadur
(74) *Attorney, Agent, or Firm* — Jefferson IP Law, LLP

(57) ABSTRACT

A method and an apparatus for a User Equipment (UE) to receive a first type of a Physical Downlink Control CHannel (PDCCH) or a second type of a PDCCH in a Transmission Time Interval (TTI) are provided whereby the first type of PDCCH and the second type of PDCCH convey respective Downlink Control Information (DCI) formats containing Cyclic Redundancy Check (CRC) bits scrambled with a Radio Network Temporary Identifier (RNTI). The method includes receiving by the UE a first bitmap associated with a number of TTIs equal to the first bitmap size, wherein each element of the first bitmap indicates whether a TTI is of a first type or of a second type, decoding by the UE only PDCCH of the first type if the TTI is of the first type, and decoding by the UE only PDCCH of the second type if the TTI is of the second type.

12 Claims, 15 Drawing Sheets

Related U.S. Application Data

(60) Provisional application No. 61/603,903, filed on Feb. 27, 2013, provisional application No. 61/704,791, filed on Sep. 24, 2012.

(52) U.S. Cl.
CPC .......... *H04L 5/0076* (2013.01); *H04L 5/0094* (2013.01); *H04W 72/0446* (2013.01); *H04L 5/0055* (2013.01); *H04W 88/02* (2013.01)

(58) Field of Classification Search
CPC ... H04L 5/0053; H04L 5/0055; H04L 5/0076; H04L 5/0094
See application file for complete search history.

(56) References Cited

U.S. PATENT DOCUMENTS

| | | |
|---|---|---|
| 2010/0042888 A1 | 2/2010 | Kuo |
| 2010/0279628 A1 | 11/2010 | Love et al. |
| 2011/0075624 A1 | 3/2011 | Papasakellariou et al. |
| 2011/0110316 A1 | 5/2011 | Chen et al. |
| 2011/0200020 A1 | 8/2011 | Xu et al. |
| 2011/0249633 A1* | 10/2011 | Hong ............... H04L 5/0053 370/329 |
| 2011/0310829 A1 | 12/2011 | Ji et al. |
| 2012/0106465 A1* | 5/2012 | Haghighat ........ H04W 72/1289 370/329 |
| 2012/0281646 A1* | 11/2012 | Liao ..................... H04L 5/0094 370/329 |
| 2013/0039284 A1* | 2/2013 | Marinier .............. H04L 5/001 370/329 |
| 2013/0100901 A1 | 4/2013 | Shan et al. |
| 2013/0194931 A1 | 8/2013 | Lee et al. |
| 2014/0112280 A1* | 4/2014 | Lee ..................... H04W 72/04 370/329 |

FOREIGN PATENT DOCUMENTS

| | | |
|---|---|---|
| EP | 2302830 A2 | 3/2011 |
| WO | 2010/127300 A2 | 11/2010 |
| WO | 2011/126212 A2 | 10/2011 |
| WO | 2011/137383 A1 | 11/2011 |
| WO | 2012/109542 A1 | 8/2012 |

OTHER PUBLICATIONS

Lee, Jun. 8, 2011, U.S. Appl. No. 61/494,422, pp. 1-47.*
U.S. Appl. No. 61/549,474, Shan et al., filed Oct. 20, 2011, pp. 1-7.
Samsung; Search Space Design for E-PDCCHs; 3GPP TSG RAN WG1 #68; R1-120190; Feb. 6-10, 2012; Dresden, German.
Samsung: ECCE Aggregation Levels and RE Threshold in a PRB Pair; 3GPP TSG RAN WG1 #70bis; R1-124377; Oct. 8-12, 2012; San Diego, CA.
Samsung; Alllocation of EPDCCH Candidates; 3GPP TSG RAN WG1 #71; R1-124921; Nov. 12-16, 2012; New Orleans, LA.
Huawei et al.; Number of blind decoding assignment; 3GPP TSG RAN WG1 Meeting #71; R1-125152; Nov. 12-16, 2012; New Orleans, LA.
Fujitsu, Search Space Design for Downlink Control Channel, 3GPP TSG RAN WG1 Meeting #68, R1-120752, XP050563277, Feb. 6-10, 2012, pp. 1-6, Dresden, Germany.

* cited by examiner

ADAPTATION OF CONTROL SIGNALING TRANSMISSIONS TO VARIATIONS IN RESPECTIVE RESOURCES

CROSS-REFERENCE TO RELATED APPLICATIONS

This application is a continuation application of prior application Ser. No. 13/777,396, filed on Feb. 26, 2013, which claimed the benefit under 35 U.S.C. § 119(e) of U.S. Provisional Applications No. 61/603,903 which was filed in the United States Patent and Trademark Office on Feb. 27, 2012, and Ser. No. 61/704,791 which was filed in the United States Patent and Trademark Office on Sep. 24, 2012, the entire disclosure of each of which is hereby incorporated by reference.

BACKGROUND OF THE INVENTION

1. Field of the Invention

The present invention is directed generally to wireless communication systems. More particularly, the present invention is related to the transmission and reception of physical downlink control channels.

2. Description of the Art

A communication system includes a DownLink (DL) that conveys transmission signals from transmission points such as Base Stations (BS or NodeBs) to User Equipments (UEs) and an UpLink (UL) that conveys transmission signals from UEs to reception points such as NodeBs. A UE, also commonly referred to as a terminal or a mobile station, may be fixed or mobile and may be a cellular phone, a personal computer device, etc. A NodeB is generally a fixed station and may also be referred to as an access point or some other equivalent terminology.

DL signals consist of data signals carrying the information content, control signals carrying DL Control Information (DCI), and Reference Signal (RS) which are also known as pilot signals. A NodeB transmits data information or DCI to UEs through respective Physical DL Shared CHannels (PD-SCHs) or Physical DL Control CHannels (PDCCHs).

UL signals also consist of data signals, control signals and RS. A UE transmits data information or UL Control Information (UCI) to a NodeB through a respective Physical Uplink Shared CHannel (PUSCH) or a Physical Uplink Control CHannel (PUCCH).

A PDSCH transmission to a UE or a PUSCH transmission from a UE may be in response to dynamic scheduling or to Semi-Persistent Scheduling (SPS). With dynamic scheduling, a NodeB conveys to a UE a DCI format through a respective PDCCH. With SPS, a PDSCH or a PUSCH transmission is configured to a UE by a NodeB through higher layer signaling, such as Radio Resource Control (RRC) signaling, and occurs at predetermined time instances and with predetermined parameters as informed by the higher layer signaling.

A NodeB also transmits one or more of multiple types of RS including a UE-Common RS (CRS), a Channel State Information RS (CSI-RS), and a DeModulation RS (DMRS). The CRS is transmitted over substantially the entire DL system BandWidth (BW) and can be used by all UEs to demodulate data or control signals or to perform measurements. A UE can determine a number of NodeB antenna ports from which a CRS is transmitted through a broadcast channel transmitted from the NodeB. To reduce the overhead associated with the CRS, a NodeB may transmit a CSI-RS with a smaller density in the time and/or frequency domain than the CRS for UEs to perform measurements. A UE can determine the CSI-RS transmission parameters through higher layer signaling from the NodeB. DMRS is transmitted only in the BW of a respective PDSCH and a UE can use the DMRS to demodulate the information in the PDSCH.

FIG. 1 is a diagram illustrating a structure for a DL Transmission Time Interval (TTI) according to the related art.

Referring to FIG. 1, a DL TTI 100 consists of one subframe 110 which includes two slots 120 and a total of $N_{symb}^{DL}$ symbols for transmitting of data information, DCI, or RS. The first $M_{symb}^{DL}$ subframe symbols are used to transmit PDCCHs and other control channels (not shown) 130. The remaining $N_{symb}^{DL}-M_{symb}^{DL}$ subframe symbols are primarily used to transmit PDSCHs 140. The transmission BW consists of frequency resource units referred to as Resource Blocks (RBs). Each RB consists of $N_{sc}^{RB}$ sub-carriers, or Resource Elements (REs), and a UE is allocated $M_{PDSCH}$ RBs for a total $M_{sc}^{PDSCH}=M_{PDSCH} \cdot N_{sc}^{RB}$ REs for the PDSCH transmission BW. Some REs in some symbols contain CRS 150, CSI-RS or DMRS. A unit of one RB in the frequency domain and one subframe in the time domain is referred to as a Physical Resource Block (PRB).

DCI can serve several purposes. A DCI format in a respective PDCCH may schedule a PDSCH or a PUSCH transmission conveying data information to or from a UE, respectively. Another DCI format in a respective PDCCH may schedule a PDSCH providing System Information (SI) to a group of UEs for network configuration parameters, or a response to a Random Access (RA) by UEs, or paging information, and so on. Another DCI format may provide to a group of UEs Transmission Power Control (TPC) commands for transmissions of respective PUSCHs or PUCCHs.

A DCI format includes Cyclic Redundancy Check (CRC) bits in order for a UE to confirm a correct detection. The DCI format type is identified by a Radio Network Temporary Identifier (RNTI) that scrambles the CRC bits. For a DCI format scheduling a PDSCH or a PUSCH to a single UE, the RNTI is a Cell RNTI (C-RNTI). For a DCI format scheduling a PDSCH conveying SI to a group of UEs, the RNTI is a SI-RNTI. For a DCI format scheduling a PDSCH providing a response to a RA from a group of UEs, the RNTI is a RA-RNTI. For a DCI format scheduling a PDSCH paging a group of UEs, the RNTI is a P-RNTI. For a DCI format providing TPC commands to a group of UEs, the RNTI is a TPC-RNTI. Each RNTI type is configured to a UE through higher layer signaling (and the C-RNTI is unique for each UE).

FIG. 2 is a block diagram illustrating an encoding process for a DCI format according to the related art.

Referring to FIG. 2, in the decoding process 200, the RNTI of the DCI format masks the CRC of the codeword in order to enable a UE to identify the DCI format type. The CRC 220 of the (non-coded) DCI format bits 210 is computed and it is subsequently masked 230 using the eXclusive OR (XOR) operation between CRC and RNTI bits 240. It is XOR(0,0)=0, XOR(0,1)=1, XOR(1,0)=1, XOR(1,1)=0. The masked CRC is then appended to the DCI format bits 250, channel coding is performed 260, for example using a convolutional code, followed by rate matching 270 to the allocated resources, and finally by interleaving and modulation 280, and then transmission of the control signal 290. For example, both the CRC and the RNTI consist of 16 bits.

FIG. 3 is a block diagram illustrating a decoding process for a DCI format according to the related art.

Referring to FIG. 3, in the decoding process 300, a received control signal 310 is demodulated and the resulting bits are de-interleaved 320, the rate matching applied at the NodeB transmitter is restored 330, and data is subsequently decoded 340. After decoding, DCI format bits 360 are obtained after extracting CRC bits 350 which are then de-masked 370 by applying the XOR operation with the RNTI 380. Finally, the UE performs a CRC test 390. If the CRC test passes, the UE considers the DCI format as valid and determines parameters for a PDSCH reception or a PUSCH transmission. If the CRC test does not pass, the UE disregards the presumed DCI format.

A NodeB separately encodes and transmits a DCI format in a respective PDCCH. To avoid a PDCCH transmission to a UE blocking a PDCCH transmission to another UE, the location of each PDCCH transmission in the time-frequency domain of the DL control region is not unique and, as a consequence, a UE needs to perform multiple decoding operations to determine whether there is a PDCCH intended for it. The REs carrying each PDCCH are grouped into Control Channel Elements (CCEs) in the logical domain. For a given number of DCI format bits, the number of CCEs for the respective PDCCH depends on the channel coding rate (Quadrature Phase Shift Keying (QPSK) is assumed as the modulation scheme). A NodeB may use a lower channel coding rate (more CCEs) for PDCCH transmissions to UEs experiencing low DL Signal-to-Interference and Noise Ratio (SINR) than to UEs experiencing a high DL SINR. The CCE aggregation levels can consist, for example, of 1, 2, 4, and 8 CCEs.

FIG. 4 is a diagram illustrating a transmission process of DCI formats in respective PDCCHs according to the related art.

Referring to FIG. 4, in the transmission process 400, the encoded DCI format bits are mapped to PDCCH CCEs in the logical domain. The first 4 CCEs (L=4), CCE1 401, CCE2 402, CCE3 403, and CCE4 404 are used to transmit a PDCCH to UE1. The next 2 CCEs (L=2), CCE5 411 and CCE6 212, are used to transmit a PDCCH to UE2. The next 2 CCEs (L=2), CCE7 421 and CCE8 422, are used to transmit a PDCCH to UE3. Finally, the last CCE (L=1), CCE9 431, is used to transmit a PDCCH to UE4. The DCI format bits may be scrambled 440 by a binary scrambling code and are subsequently modulated 450. Each CCE is further divided into Resource Element Groups (REGs) (i.e., "mini CCEs"). For example, a CCE consisting of 36 REs can be divided into 9 REGs, each consisting of 4 Res. Interleaving 460 is applied among REGs (blocks of 4 QPSK symbols). For example, a block interleaver may be used. The resulting series of QPSK symbols may be shifted by J symbols 470, and finally each QPSK symbol is mapped to an RE 480 in the control region of the DL subframe. Therefore, in addition to the CRS, 491 and 492, and other control channels (e.g., 493), the REs in the PDCCH contain QPSK symbols corresponding to DCI format for UE1 494, UE2 495, UE3 496, and UE4 497.

For the PDCCH decoding process, a UE may determine a search space for candidate PDCCH locations after it restores the CCEs in the logical domain according to a UE-common set of CCEs (Common Search Space or CSS) and according to a UE-dedicated set of CCEs (UE-Dedicated Search Space or UE-DSS). The CSS may consist of the first CCEs in the logical domain. PDCCHs for DCI formats associated with UE-common control information and use SI-RNTI, or P-RNTI, or RA-RNTI, or TPC-RNTI, and so on, to scramble the respective CRCs are always transmitted in the CSS. The UE-DSS consists of CCEs used to transmit PDCCHs for DCI formats associated with UE-specific control information and use respective C-RNTIs to scramble the respective CRCs. The CCEs of a UE-DSS may be determined according to a pseudo-random function having as inputs UE-common parameters, such as a subframe number or a total number of CCEs in a subframe, and UE-specific parameters such as the C-RNTI. For example, for a CCE aggregation level $L \in \{1,2,4,8\}$ CCEs, the CCEs corresponding to PDCCH candidate m are given by:

$$\text{CCEs for PDCCH candidate } m = L \cdot \{(Y_k+m) \bmod \lfloor N_{CCE,k}/L \rfloor\}+i \quad \text{Equation (1)}$$

In Equation 1, $N_{CCE,k}$ is the total number of CCEs in subframe k, $i=0, \ldots, L-1$, $m=0, \ldots, M_C^{(L)}-1$, and $M_C^{(L)}$ is the number of PDCCH candidates to monitor in the UE-DSS. Exemplary values of $M_C^{(L)}$ for $L \in \{1,2,4,8\}$ are, respectively, $\{6, 6, 2, 2\}$. For the UE-DSS, $Y_k=(A \cdot Y_{k-1}) \bmod D$ where $Y_{-1}=\text{C-RNTI} \neq 0$, $A=39827$ and $D=65537$. For the CSS, $Y_k=0$.

The DL control region in FIG. 1 is assumed to occupy a maximum of $M_{symb}^{DL}=3$ subframe symbols and a PDCCH is transmitted substantially over the entire DL BW. This configuration limits PDCCH capacity of the DL control region and cannot support interference coordination in the frequency domain among PDCCH transmissions from different NodeBs. Expanded PDCCH capacity or PDCCH interference coordination in the frequency domain is needed in several cases. One such case is the use of Remote Radio Heads (RRHs) in a network where a UE may receive DL signals either from a macro-NodeB or from an RRH. If the RRHs and the macro-NodeB share the same cell identity, cell splitting gains do not exist and expanded PDCCH capacity is needed to accommodate PDCCH transmissions from the macro-NodeB and the RRHs. Another case exists regarding heterogeneous networks where DL signals from a pico-NodeB experience strong interference from DL signals from a macro-NodeB, and interference coordination in the frequency domain among the NodeBs is needed.

A direct extension of the legacy DL control region to more than $M_{symb}^{DL}=3$ subframe symbols is not possible at least due to the requirement to support legacy UEs which are not aware of nor support such an extension. An alternative is to support DL control signaling in the conventional PDSCH region by using individual PRBs to transmit control channels. A PDCCH transmitted in PRBs of the conventional PDSCH region will be referred to as Enhanced PDCCH (EPDCCH).

FIG. 5 is a diagram illustrating an EPDCCH transmission structure in a DL TTI according to the related art.

Referring to FIG. 5, although EPDCCH transmissions 500 start immediately after the legacy PDCCHs 510 and are over all remaining subframe symbols, they may instead always start at a fixed location, such as the fourth subframe symbol, and extend over a part of the remaining subframe symbols. EPDCCH transmissions occur in four PRBs, 520, 530, 540, and 550 while the remaining PRBs are used for PDSCH transmissions 560, 562, 564, 566, 568.

A UE can be configured by higher layer signaling the PRBs that may convey EPDCCHs. The transmission of an EPDCCH to a UE may be in a single PRB, if a NodeB has accurate CSI for the UE and can perform Frequency Domain Scheduling (FDS) or beam-forming, or it may be in multiple PRBs if accurate CSI is not available at the NodeB or if the EPDCCH is intended for multiple UEs. An EPDCCH transmission over a single PRB (or a few PRBs contiguous in frequency) will be referred to herein as localized or non-interleaved, whereas an EPDCCH transmission over multiple non-contiguous in frequency PRBs will be referred to herein as distributed or interleaved.

The exact EPDCCH search space design is not material to the claimed invention and may or may not follow the same principles as the PDCCH. An EPDCCH consists of respective CCEs referred to as Enhanced CCEs (ECCEs), and a number of EPDCCH candidate locations exist for each possible ECCE aggregation level $L_E$. For example, $L_E \in \{1, 2,4\}$ ECCEs for localized EPDCCHs and $L_E \in \{1,2,4,8\}$ ECCEs for distributed EPDCCHs. An ECCE may or may not have a same size as a legacy CCE, and an ECCE for a localized EPDCCH may or may not have a same size as an ECCE for a distributed EPDCCH.

Several aspects for the combined PDCCH and EPDCCH operation in FIG. 5 need to be defined in order to provide a functional operation. One aspect is the process for UE scheduling. As a legacy UE cannot receive EPDCCHs, support of PDCCHs needs to be maintained. However, in many cases, for example in heterogeneous networks, a UE may not be able to reliably receive PDCCHs, or PDCCHs may not exist. Duplicating the transmission of a same DCI format in a PDCCH and an EPDCCH will increase the respective overhead and should be avoided. Moreover, for networks where a macro-NodeB and pico-NodeBs share a same cell identity, the capacity of the legacy CSS may not be sufficient to convey TPC commands to all UEs in the coverage area of the macro-NodeB.

FIG. 6 is a diagram illustrating a network supporting with a same cell identity a macro-NodeB and several pico-NodeBs according to the related art.

Referring to FIG. 6, network 600 includes UE 1 610 which communicates with pico-NodeB#1 615. UE 2 620 communicates with pico-NodeB#2 625. UE 3 630 communicates with pico-NodeB#3 635. Finally, UE 4 640 communicates with the macro-NodeB 645. Although UE1, UE2, and UE3 are within the coverage area of the macro-NodeB, capacity issues may exist for relying on PDCCH from the macro-NodeB due to the resource limitation of the legacy DL control region. In particular, although all UEs in the coverage area of the macro-NodeB can receive SI, RA response, or paging from the macro-NodeB, regardless whether a UE is associated with a pico-NodeB or with the macro-NodeB, the macro-NodeB may not be able to transmit TPC commands to all UEs in its coverage area. Due to the limited number of CCEs in the legacy CSS, transmission of multiple PDCCHs to convey TPC commands to UEs communicating with the pico-NodeBs may not be possible. Moreover, a pico-NodeB cannot transmit its own PDCCHs, as they will interfere with the PDCCHs transmitted by the macro-NodeB.

FIG. 7 is a diagram illustrating an interference co-ordination method in a heterogeneous network according to the related art.

Referring to FIG. 7, heterogeneous network 700 includes UE 1 710 which communicates with pico-NodeB#1 715. UE 2 720 communicates with pico-NodeB#2 725. Finally, UE 3 730 communicates with a macro-NodeB 735. As the macro-NodeB transmits with much larger power than a pico-NodeB, a signal reception at a UE communicating with a pico-NodeB and located near the edge of the coverage area of the pico-NodeB will experience significant interference from signals transmitted by the macro-NodeB. To avoid such interference, the macro-NodeB may blank the transmission of some or all of its signals in certain subframes which can then be used by pico-NodeBs to transmit to UEs located near the edge of the respective coverage areas. For example, the macro-NodeB 740 may substantially reduce (and even nullify) the transmission power of some or all of its signals in subframe 1 745 while transmitting signals with their nominal power in other subframes, while a pico-NodeB may transmit signals with their nominal power in all subframes 750. Subframe 1 is referred to as an Almost Blank Subframe (ABS). ABSs are transparent to UEs and are communicated among NodeBs over an X2 interface in order to facilitate Inter-Cell Interference Coordination (ICIC). ABSs and non-ABSs are indicated using a bitmap spanning a number of subframes such as twenty, forty, or seventy subframes, with a binary 0 indicating, for example, a non-ABS and a binary 1 indicating an ABS.

Another aspect is a variation in a number of REs available for EPDCCH transmissions per PRB, for example, depending on a size of the legacy DL control region, defined by the number of $M_{symb}^{DL}$ subframe symbols in FIG. 1, on the existence of CSI-RS REs, on the number of CRS REs, DMRS REs, and so on. This variation can be addressed either by maintaining a same ECCE size and having a variable number of ECCEs per PRB (and possibly also having some REs that cannot be allocated to an ECCE) or by maintaining a same number of ECCEs per PRB and having a variable ECCE size.

FIG. 8 is a diagram illustrating variations in an average ECCE size per PRB according to the related art.

Referring to FIG. 8, in a first realization of the contents of a PRB 810, the legacy DL control region spans the first three subframe symbols 820 and there is a first number of DMRS REs 830, CSI-RS REs 832, and CRS REs 834. For 4 ECCEs per PRB, the average number of REs per ECCE is 21. In a second realization of the contents of a PRB 850, the legacy DL control region spans the first two subframe symbols 860 and there is a second number of DMRS REs 870 and CRS REs 872 (no CSI-RS REs). For 4 ECCEs per PRB, the average number of REs per ECCE is 27, or about 29% more than in the first realization. Larger variations in the ECCE size may also exist as the size of the DL control region may be even smaller than 2 OFDM symbols and the number of CRS REs may further decrease.

Therefore, a need exists to define a set of subframes where a UE decodes PDCCH and another set of subframes where the UE decodes EPDCCH.

Another need exists to support transmissions of EPDCCHs in a set of PRBs, from one or more sets of PRBs, while allowing the number of the sets PRBs to vary per subframe.

Yet another need exists to support transmissions of EPDCCHs in one or more ECCEs while allowing a number of REs in an ECCE that can be used to transmit an EPDCCH to vary per subframe.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide methods and apparatus for a User Equipment (UE) to decode a Physical Downlink Control CHannel (PDCCH) in a Transmission Time Interval (TTI).

In accordance with an aspect of the present invention, a method for a UE communicating with a base station receives either a first type of a PDCCH or a second type of a PDCCH (e.g., Enhanced PDCCH (EPDCCH)) in a TTI, the first type of PDCCH and the second type of PDCCH conveying respectively Downlink Control Information (DCI) formats containing Cyclic Redundancy Check (CRC) bits scrambled with a same type of a Radio Network Temporary Identifier (RNTI) is provided. The method includes receiving by the UE a first bitmap associated with a number of TTIs equal to the first bitmap size, wherein each element of the first bitmap indicates whether a TTI is of a first type or of a second type, decoding by the UE only PDCCH of the first type if the TTI is of the first type, and decoding by the UE only PDCCH of the second type if the TTI is of the second type.

In accordance with another aspect of the present invention, a method for a UE communicating with a base station to receive a PDCCH transmitted by the base station in Resource Elements (REs) of a set of Physical Resource Blocks (PRBs), a single PRB of the set of PRBs comprising a number of frequency sub-carriers over a TTI, using an aggregation level of L Control Channel Elements (CCEs) in one of $M^{(L)}$ candidate PDCCH locations, is provided. The method includes determining by the UE whether the number of REs in a PRB available for transmitting PDCCHs is smaller than a predetermined number, determining by the UE a first number of $M^{(L)}$ candidate PDCCH locations for decoding respective PDCCHs if the number of REs in a PRB available for transmitting PDCCHs is smaller than the predetermined number, and determining by the UE a second number of $M^{(L)}$ candidate PDCCH locations for decoding respective PDCCHs if the number of REs in a PRB available for transmitting PDCCHs is larger than or equal to the predetermined number wherein the first number is different than the second number.

In accordance with yet another aspect of the present invention, a UE apparatus for receiving either a first type of a PDCCH or a second type of a PDCCH transmitted by a base station in a TTI, the first type of PDCCH and the second type of PDCCH conveying respective Downlink Control Information (DCI) formats containing CRC bits scrambled with a same type of a RNTI, is provided. The apparatus includes a receiver configured to receive a first bitmap associated with a number of TTIs equal to the first bitmap size, wherein each element of the first bitmap indicates whether a TTI is of a first type or of a second type, and a detector configured to detect only PDCCH of the first type if the TTI is of the first type, and to detect only PDCCH of the second type if the TTI is of the second type.

In accordance with still another aspect of the present invention, an apparatus for receiving a PDCCH transmitted by a base station in REs of a set of PRBs, a single PRB of the set of PRBs comprising of a number of frequency sub-carriers over a TTI, using an aggregation level of L CCEs in one of $M^{(L)}$ candidate PDCCH locations is provided. The apparatus includes a comparator configured to determine whether the number of REs in a PRB available for transmitting PDCCHs is smaller than a predetermined number, a searcher configured to determine a first number of $M^{(L)}$ candidate PDCCH locations if the number of REs in a PRB available for transmitting PDCCHs is smaller than the predetermined number or to determine a second number of $M^{(L)}$ candidate PDCCH locations if the number of REs in a PRB available for transmitting PDCCHs is larger than or equal to the predetermined number wherein the first number is different than the second number, and a decoder configured to decode PDCCHs in the respective candidate PDCCH locations.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
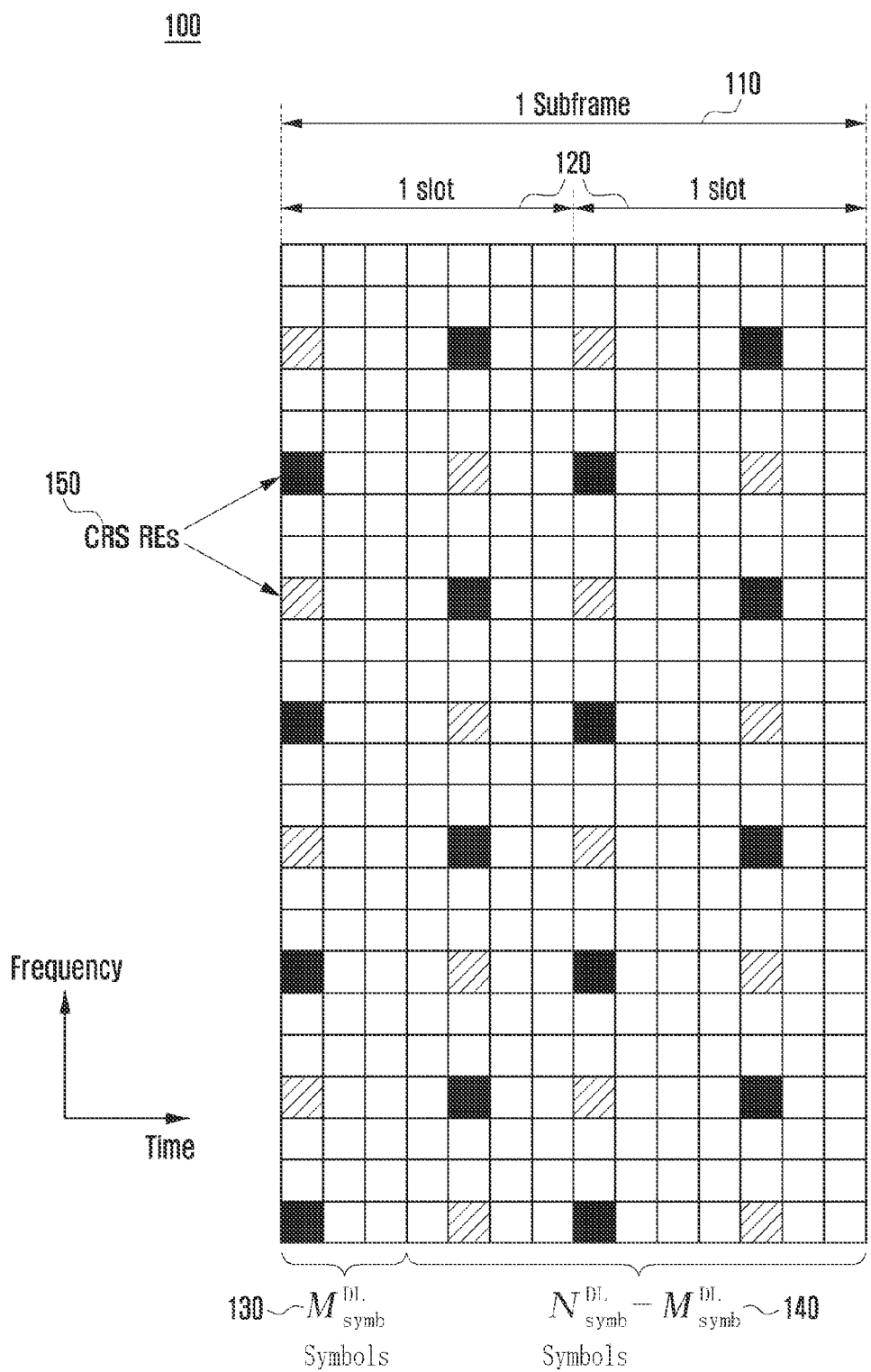
FIG. 1 is a diagram illustrating a structure for a DownLink (DL) Transmission Time Interval (TTI) according to the related art.
Figure 2:
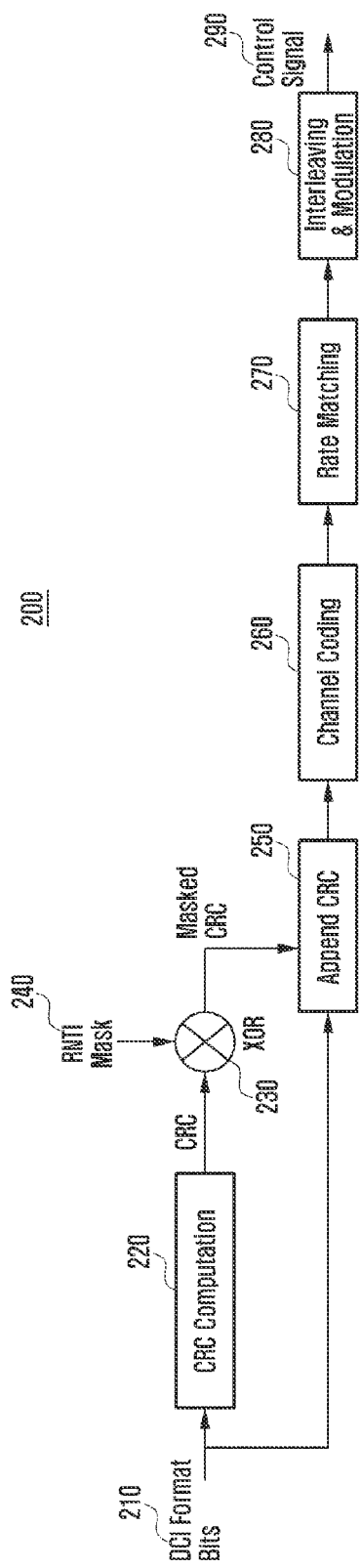
FIG. 2 is a block diagram illustrating an encoding process for a DL Control Information (DCI) format according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Additionally, although exemplary embodiments of the present invention will be described below with reference to Orthogonal Frequency Division Multiplexing (OFDM), they also are applicable to all Frequency Division Multiplexing (FDM) transmissions in general and to Discrete Fourier Transform (DFT)-spread OFDM in particular.

A first exemplary embodiment considers methods and apparatus for providing a DownLink (DL) Control Information (DCI) format scheduling User Equipment (UE)-common DCI or UE-dedicated DCI either by an Enhanced Physical DL Control Channel (EPDCCH) or by a Physical DL Control Channel (PDCCH) but not with both in a same subframe. As it is subsequently described in the context of Almost Blank Subframe (ABS), this is achieved by a NodeB signaling to the UE a bitmap indicating, over a number of subframes equal to the bitmap size, the subframes where the UE should monitor PDCCH and the subframes where the UE should monitor EPDCCH. The existence of an EPDCCH conveying a DCI format scheduling UE-common DCI (or UE-dedicated DCI) to a UE is conditioned on the existence of a respective PDCCH with a desired reliability or capacity.

In a heterogeneous network, a macro-NodeB may use ABSs for Inter-Cell Interference Coordination (ICIC) purposes in order to enable UEs communicating with pico-NodeBs that are in the coverage area of the macro-NodeB and nominally experience strong interference by signals transmitted by the macro-NodeB to reliably receive signals from their respective pico-NodeBs. In an ABS, the macro-NodeB substantially reduces the transmission power of some signals, including suspending transmissions, in order to avoid creating interference to susceptible UEs that communicate with pico-NodeBs.

A PDCCH conveying a DCI format scheduling UE-common DCI from a macro-NodeB needs to be reliably received by multiple UEs, including possibly all UEs in the coverage area of the macro-NodeB. These UEs may be experiencing a wide range of respective Signal-to-Interference and Noise Ratio (SINR) reflecting respective PDCCH detection reliabilities. Consequently, a PDCCH conveying a DCI format scheduling UE-common DCI to a group of UEs should be preferably transmitted with its nominal power in order to ensure the desired detection reliability at the UE, in a group of UEs, experiencing the worst SINR. Therefore, UEs communicating with the macro-NodeB cannot be scheduled, in practice, for UE-common DCI during ABSs. The same applies in practice for UE-dedicated DCI which a macro-NodeB cannot typically transmit in ABSs.

To avoid the above limitations, the macro-NodeB may transmit EPDCCHs providing UE-common DCI, such as System Information (SI), Random Access (RA) response, paging, or UE-dedicated DCIs in ABSs. To avoid duplicating the transmission of a DCI format scheduling UE-common DCI, a macro-NodeB in a non-ABS may convey such DCI format using only PDCCHs. As a PDCCH substantially spans the entire DownLink (DL) BandWidth (BW) and its detection at a UE is based on a Common Reference Signal (CRS), then, for the same transmission power and coding rate, a PDCCH is typically more reliable than a distributed EPDCCH which may experience worse frequency diversity because it only spans a few Physical Resource Blocks (PRBs) and detects the EPDCCH using a worse channel estimation that is based on a DeModulation Reference Signal (DMRS) contained in those PRBs.

Figure 9:
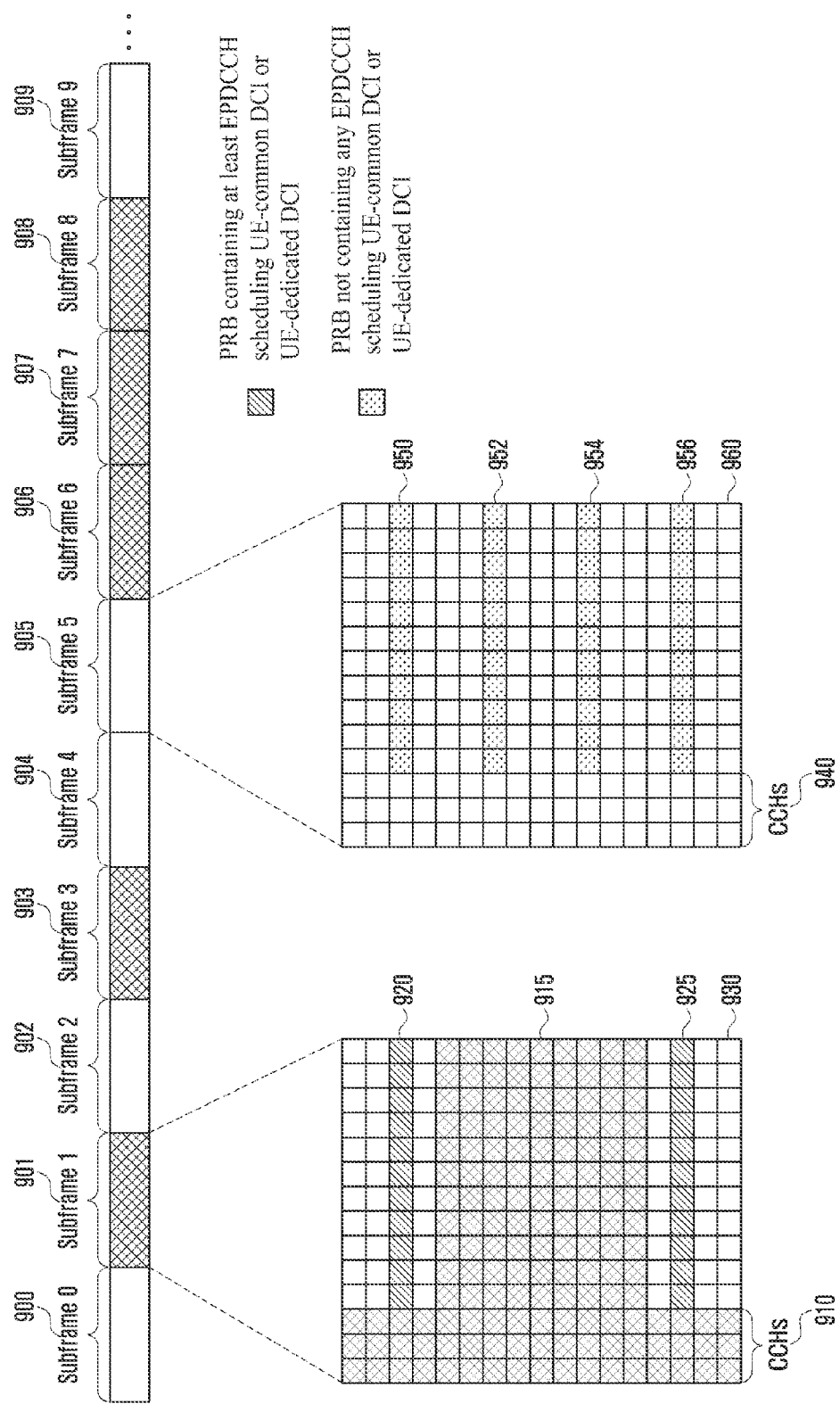
FIG. 9 is a diagram illustrating a conditional transmission of EPDCCHs according to an exemplary embodiment of the present invention.

FIG. 9 is a diagram illustrating a conditional transmission of EPDCCHs according to an exemplary embodiment of the present invention.

Referring to FIG. 9, in a frame consisting of ten subframes, subframe 0 900, subframe 2 902, subframe 4 904, subframe 5 905, and subframe 9 909 are configured to a UE as non-ABSs, whereas subframe 1 901, subframe 3 903, subframe 6 906, subframe 7 907, and subframe 8 908 are configured to a UE as ABSs. The configuration is through a respective bitmap of size 10. In an ABS, such as subframe 1, the macro-NodeB transmits with reduced power, including suspending transmission (zero power), PDCCHs 910 and Physical DL Shared Channels (PDSCHs) in some Resource Blocks (RBs) 915. The macro-NodeB transmits EPDCCHs with their nominal power in their respective RBs 920 and 925. As transmission of PDCCHs may not exist, or may be with reduced power, transmission of DCI formats with Cyclic Redundancy Check (CRC) scrambled by SI-Radio Network Temporary Identifier (RNTI), RA-RNTI, PDSCH (P)-RNTI, or Cell (C)-RNTI may be performed by EPDCCHs. The macro-NodeB may also transmit with nominal power PDSCHs in respective PRBs 930 where, in practice, pico-NodeBs do not transmit PDSCHs to respective UEs experiencing strong interference from the macro-NodeB. Conversely, in non-ABSs such as subframe 5, the macro-NodeB transmits PDCCHs with nominal power 940. The macro-NodeB may also transmit with nominal power EPDCCHs (for some UEs) in respective PRBs 950, 952, 954, 956, and 960. Due to the transmission of PDCCHs with nominal power, EPDCCHs need not convey DCI formats with CRC scrambled by SI-RNTI, RA-RNTI, P-RNTI, or C-RNTI which are instead conveyed by PDCCHs.

To obtain a DCI format scheduling UE-common DCI (such as SI, RA response, or paging), or UE-dedicated DCI, a UE performs decoding operations for respective EPD-CCHs (with CRC scrambled with a SI-RNTI, RA-RNTI, P-RNTI, or C-RNTI respectively) in an enhanced Common Search Space (CS S) or in an enhanced UE-DSS, respectively, in ABS subframes and performs decoding operations for respective PDCCHs (with CRC scrambled with a SI-RNTI, RA-RNTI, P-RNTI, or C-RNTI) in the legacy CSS or in the legacy UE-DSS, respectively, in non-ABS subframes.

Figure 10:
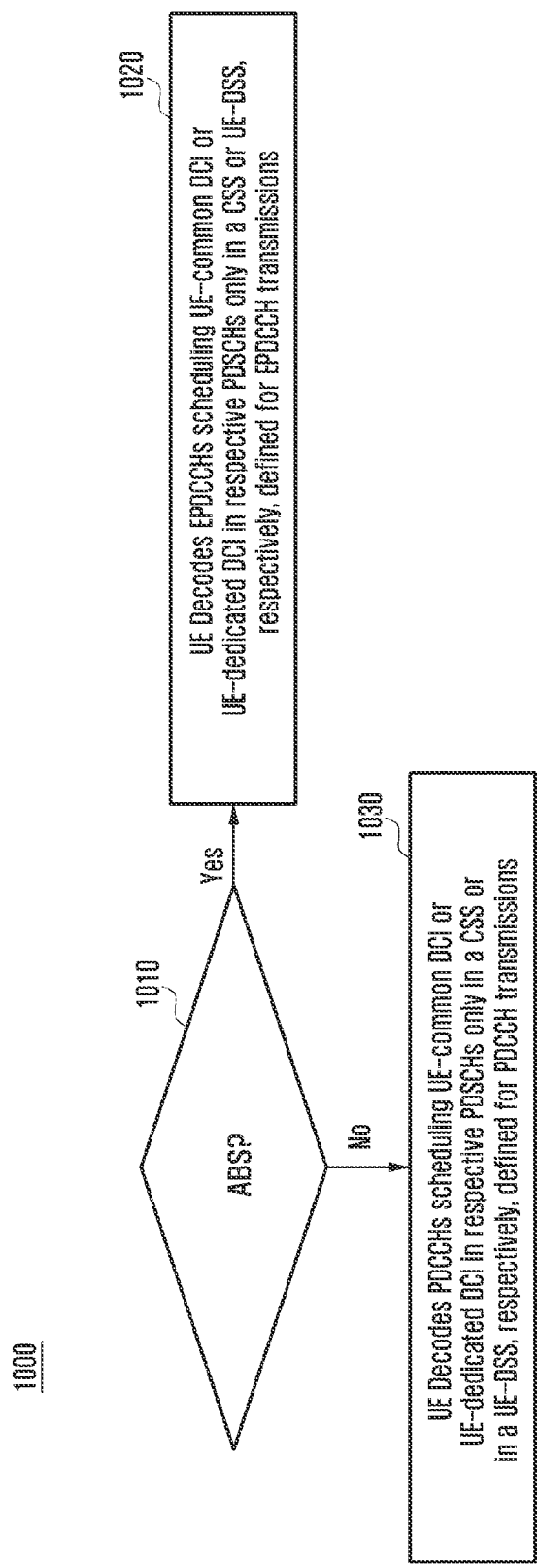
FIG. 10 illustrates decoding operations a User Equipment (UE) performs to detect EPDCCHs and PDCCHs conveying DCI formats with Cyclic Redundancy Check (CRC) scrambled by System Information (SI)-Radio Network Temporary Identifier (RNTI), Random Access (RA)-RNTI, PDSCH (P)-RNTI, or Cell (C)-RNTI according to an exemplary embodiment of the present invention.

FIG. 10 illustrates decoding operations a UE performs to detect EPDCCHs and PDCCHs conveying DCI formats with CRC scrambled by SI-RNTI, RA-RNTI, P-RNTI, or C-RNTI according to an exemplary embodiment of the present invention.

Figure 3:
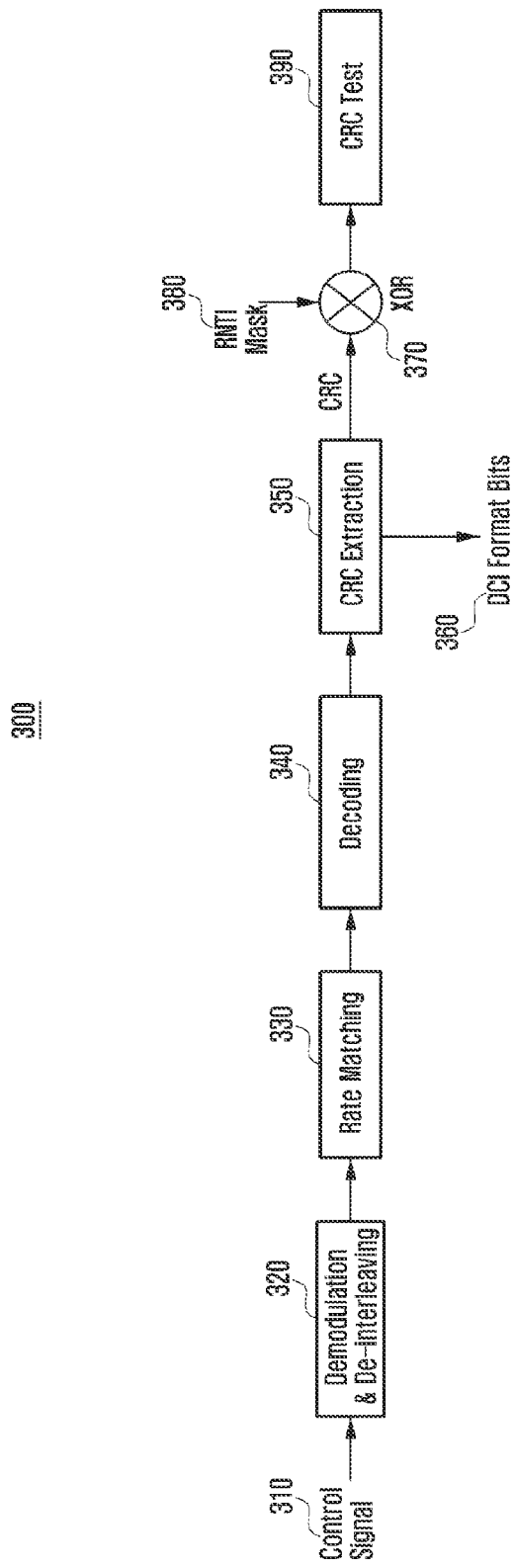
FIG. 3 is a block diagram illustrating a decoding process for a DCI format according to the related art.
Figure 4:
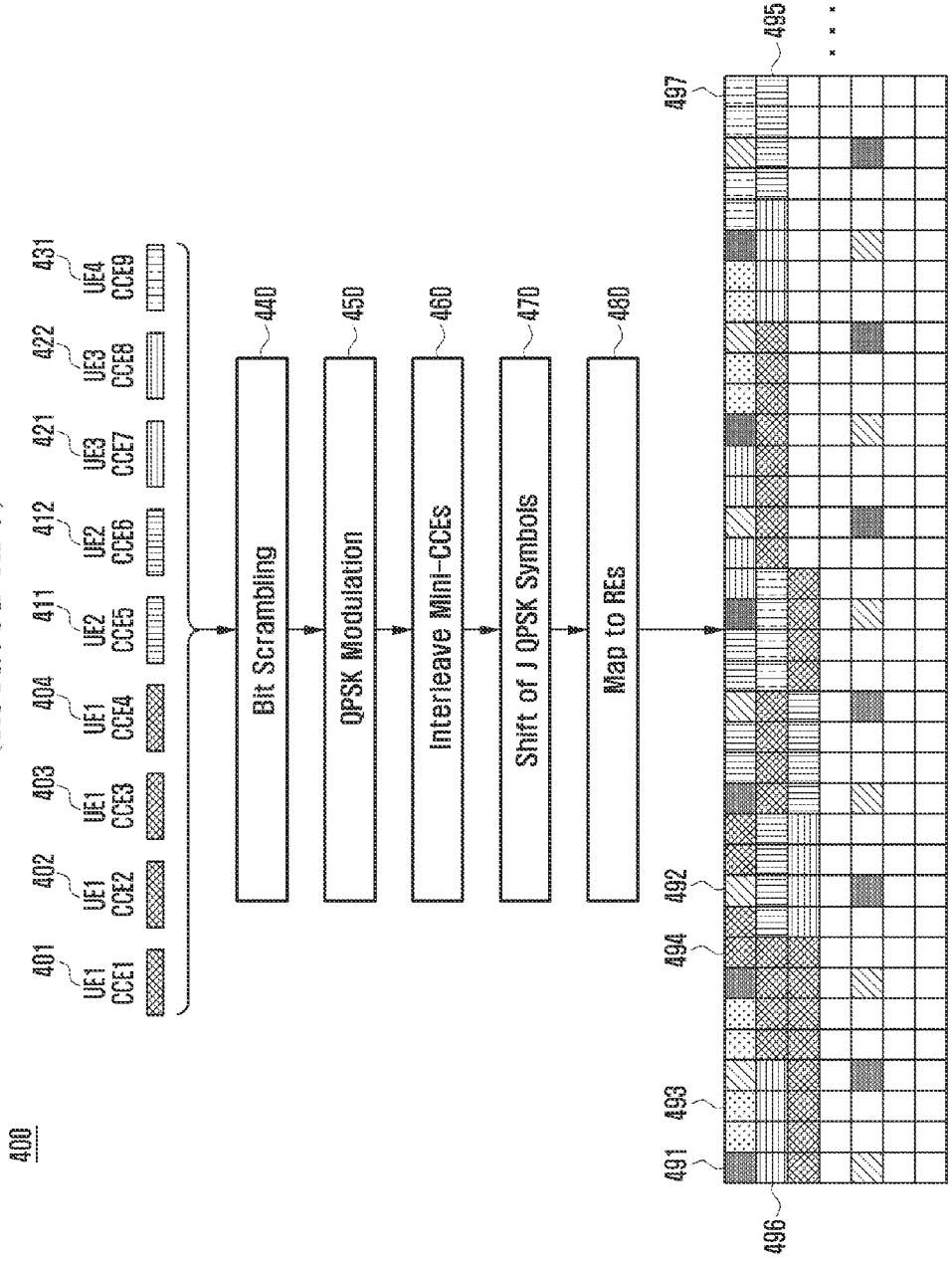
FIG. 4 is a diagram illustrating a transmission process of DCI formats in respective Physical DL Control Channels (PDCCHs) according to the related art.
Figure 5:
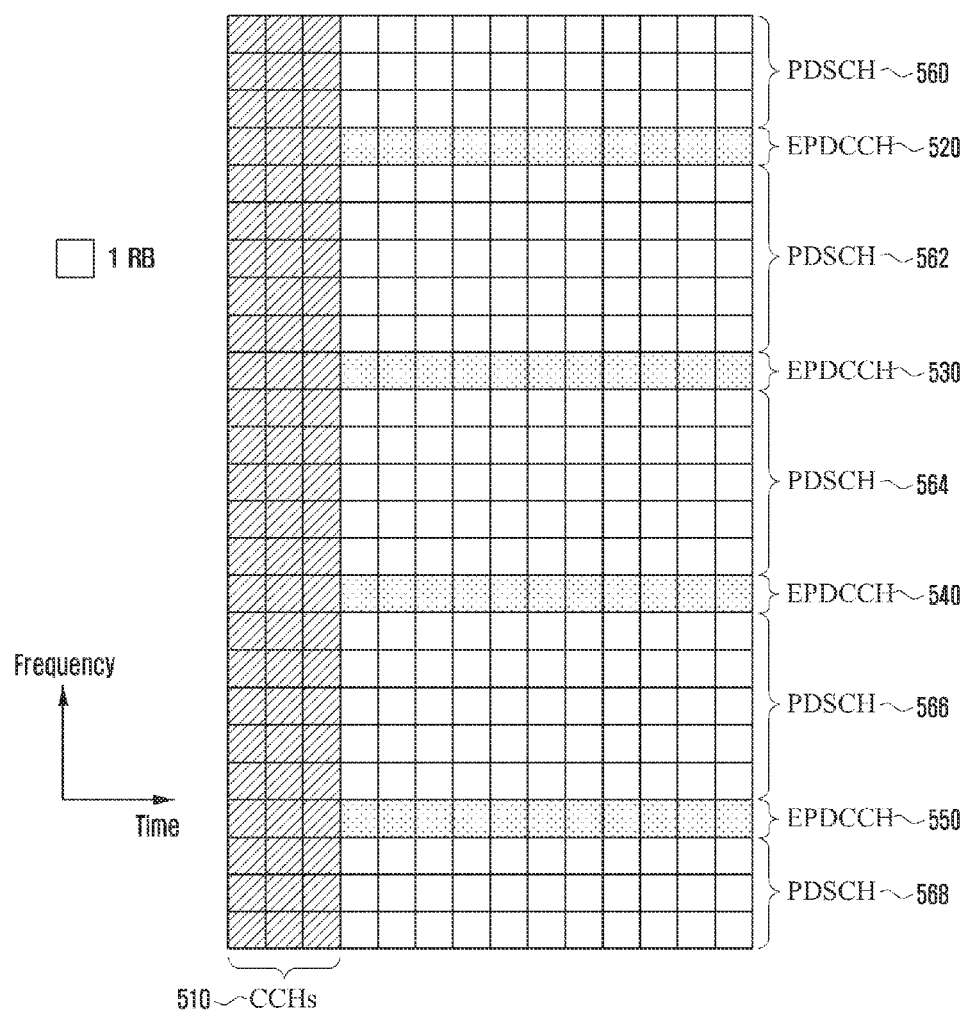
FIG. 5 is a diagram illustrating an Enhanced PDCCH (EPDCCH) transmission structure in a DL TTI according to the related art.
Figure 6:
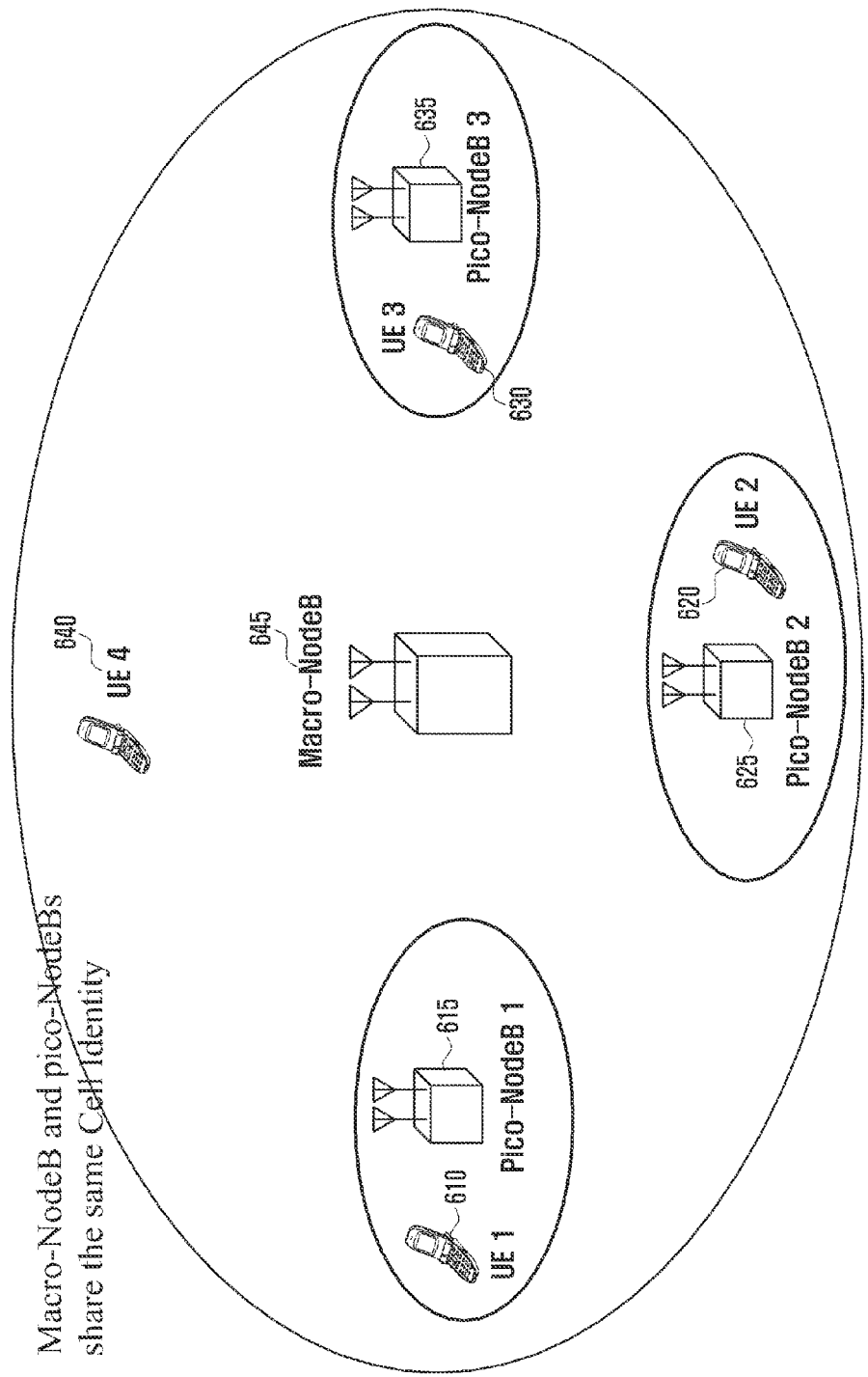
FIG. 6 is a diagram illustrating a network supporting with a same cell identity a macro-NodeB and several pico-NodeBs according to the related art.
Figure 7:
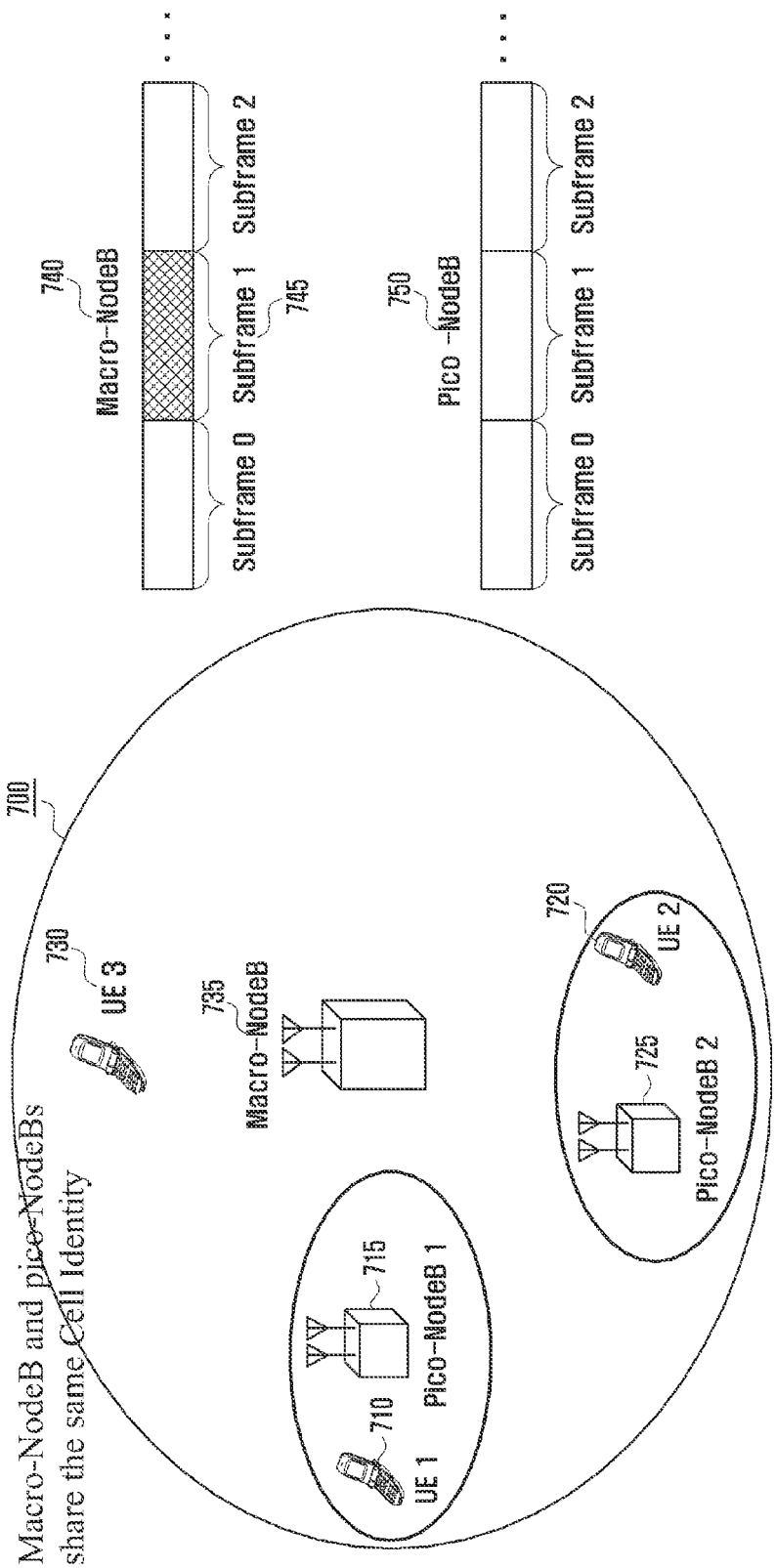
FIG. 7 is a diagram illustrating an interference co-ordination method in a heterogeneous network according to the related art.
Figure 8:
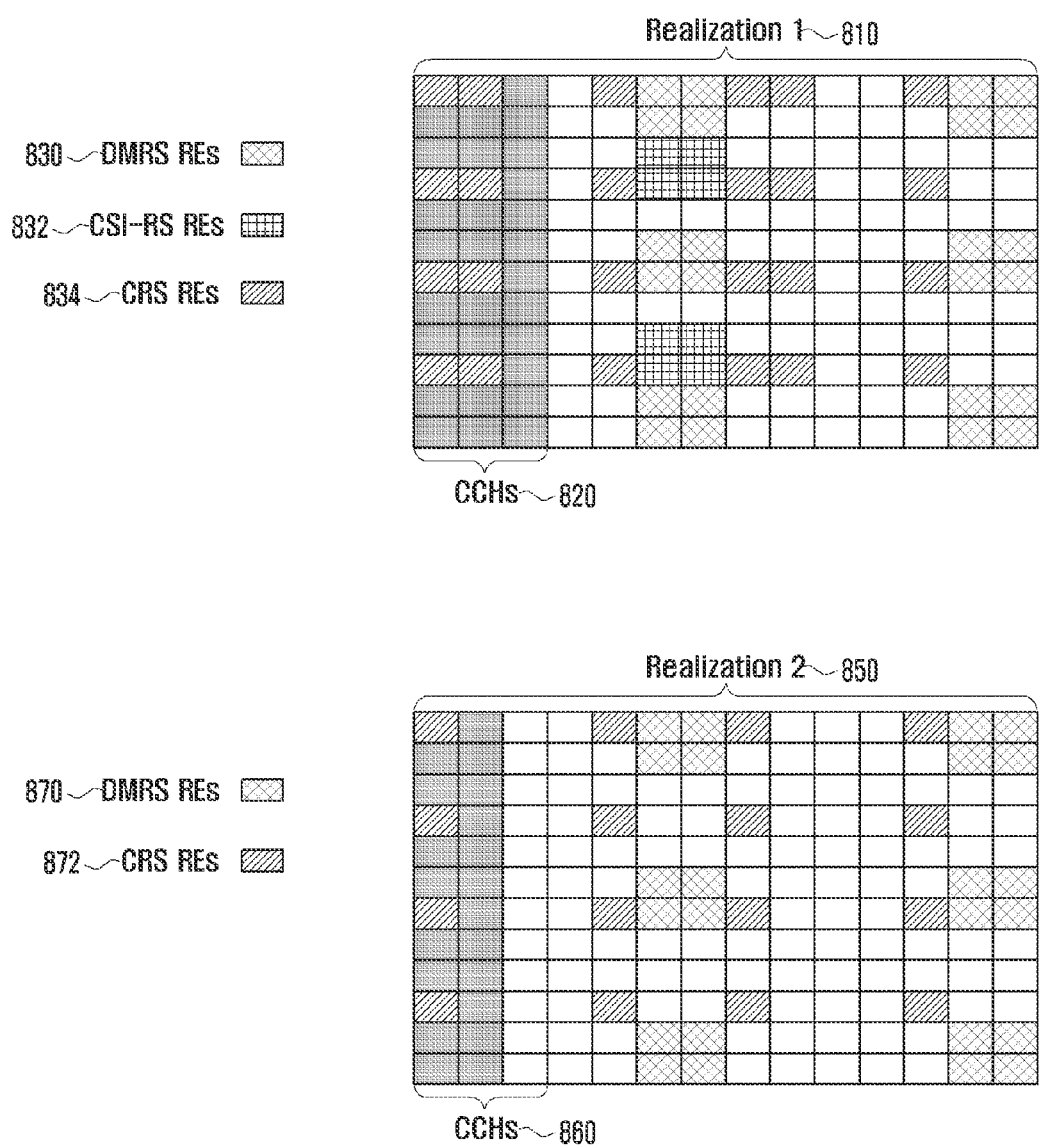
FIG. 8 is a diagram illustrating variations in an average Enhanced Control Channel Element (ECCE) size per Physical Resource Block (PRB) according to the related art.

Referring to FIG. 10, in decoding operation 1000, a UE performs decoding operations to detect EPDCCHs and PDCCHs conveying DCI formats with CRC scrambled by SI-RNTI, RA-RNTI, P-RNTI, or C-RNTI, depending on the configured subframe type 1010. The UE decoder may be, for example, as described in FIG. 3 with the following additional controller functions. If the subframe is an ABS, DCI formats scheduling UE-common DCI or UE-dedicated DCI may be provided only by EPDCCHs and a UE may perform decoding operations for these EPDCCHs only in an enhanced CSS 1020 or in an enhanced UE-DSS. If the subframe is not an ABS, DCI formats scheduling UE-common DCI or UE-dedicated DCI may be provided only by PDCCHs and a UE performs decoding operations for these PDCCHs only in a legacy CSS 1030 or in a legacy UE-DSS.

The use of ABS without the use of EPDCCHs may limit the number of DL or UL Hybrid Automatic Repeat reQuest (HARQ) processes that can be supported by a macro-NodeB for most UEs due to an inability of the macro-NodeB to schedule PDSCH or PUSCH, in an ABS. Using EPDCCH and interference coordination in the frequency domain (across RBs) among the macro-NodeB and the pico-NodeBs allows the use of all HARQ processes and improved system operation. However, the transmission of ACKnowledgement (ACK) signals for an HARQ process (HARQ-ACK signals) from the macro-NodeB in response to receptions of data information in respective PUSCHs may be limited in ABS due to, for example, the absence of, or due to power limitations of HARQ-ACK signaling. The same approach as for the transmission of DCI formats by respective EPD-CCHs can also be followed in this case. If the subframe where an HARQ-ACK signal is to be transmitted by the macro-NodeB is configured to a UE as an ABS, the transmission can occur in PRBs configured for EPDCCH transmissions by using some Resource Elements (REs) to transmit HARQ-ACK signals. Otherwise, if the subframe where an HARQ-ACK signal is to be transmitted by the macro-NodeB is configured to the UE as a non-ABS, the transmission of the HARQ-ACK signal occurs as usual in the legacy DL control region (by allocating some REs to HARQ-ACK signal transmissions).

In addition to PDCCHs or EPDCCHs providing DCI formats scheduling transmission of UE-common DCI or UE-dedicated DCI, PDCCHs or EPDCCHs may only provide Transmission Power Control (TPC) commands to a group of UEs (without scheduling a respective PDSCH or PUSCH) through a DCI format with CRC scrambled by a TPC-RNTI. Each TPC command in the group of TPC commands is intended for a UE in the group of UEs and each UE is configured the placement in the DCI format of the TPC command intended for it. In order to avoid duplication in the transmission of a DCI format with CRC scrambled by a TPC-RNTI by both a PDCCH and an EPDCCH and avoid the capacity limitations of a legacy CSS, a UE can be configured whether to perform respective decoding operations either for PDCCHs or for EPDCCHs. Capacity limitation of the legacy CCS may occur as, for example, a legacy CSS may consist of only 16 Control Channel Elements (CCEs) which may need to be used in a subframe to transmit PDCCHs with CRCs scrambled by SI-RNTIs, RA-RNTIs, P-RNTIs, or TPC-RNTIs. Without considering the existence of ABS, the transmission of DCI formats with CRCs scrambled with a SI-RNTI, or RA-RNTI, or P-RNTI may be exclusively performed by PDCCHs, while a UE may be configured based on whether the transmission of a DCI format scrambled with a TPC-RNTI is by a PDCCH or by an EPDCCH. Therefore, a UE may monitor a legacy CSS for DCI formats with CRC scrambled with a SI-RNTI, a RA-RNTI, or a P-RNTI, but it can be configured to monitor either a legacy CSS (PDCCH) or an enhanced CSS (EPD-CCH) for a DCI format with CRC scrambled with a TPC-RNTI (or, in general, with another UE-common RNTI).

Figure 11:
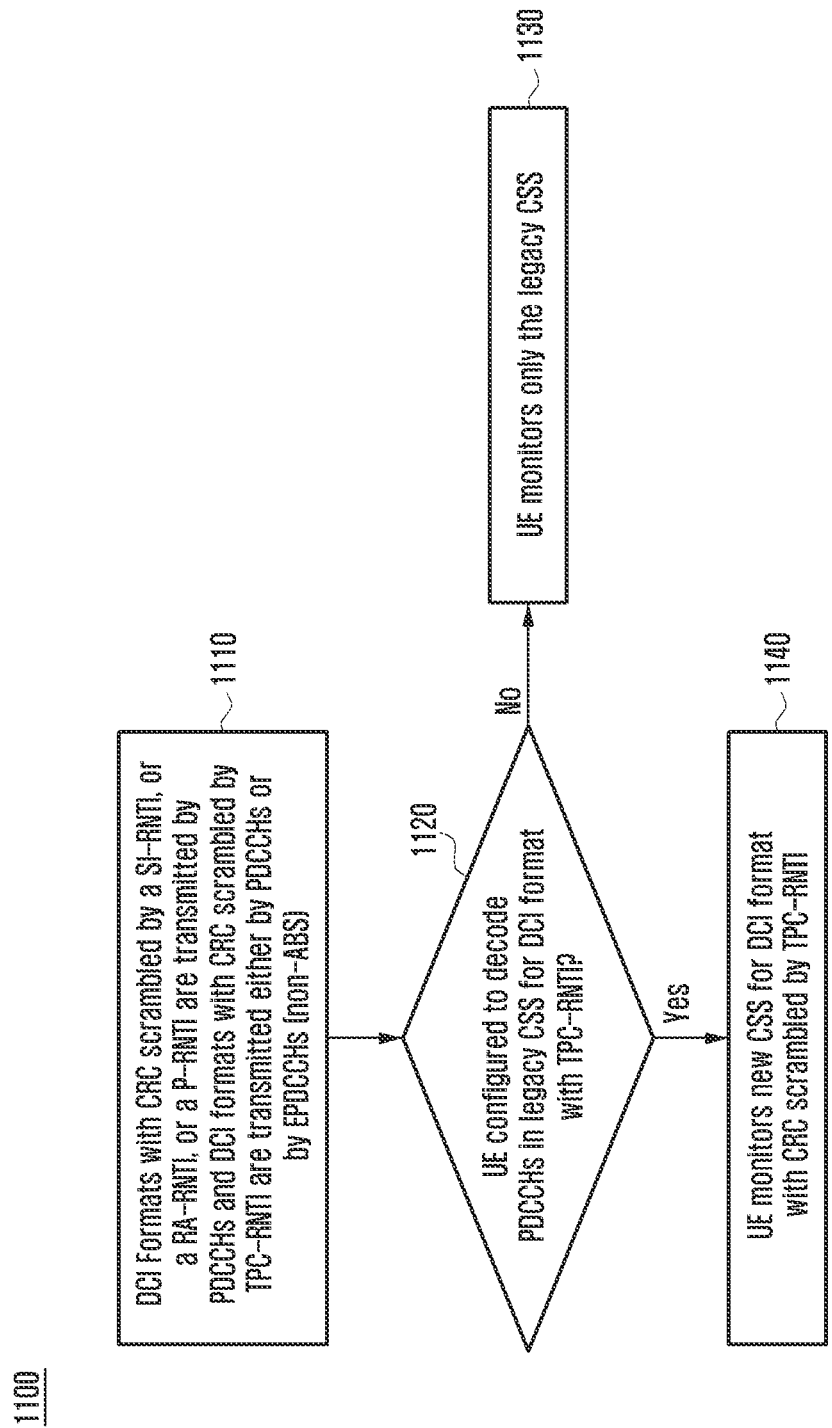
FIG. 11 is a diagram illustrating a process for a UE to perform decoding operations in a legacy Common Search Space (CSS) and in an enhanced CSS according to an exemplary embodiment of the present invention.

FIG. 11 is a diagram illustrating a process for a UE to perform decoding operations in a legacy CSS and in an enhanced CSS according to an exemplary embodiment of the present invention.

Referring to FIG. 11, in a process for UE to perform decoding operations 1100, a UE (in non-ABS) always performs decoding operations for PDCCHs in a legacy CSS in order to potentially detect DCI formats with CRC scrambled with SI-RNTI, RA-RNTI, or P-RNTI. However, for a DCI format scrambled with a TPC-RNTI, the UE is configured to either perform decoding operations for PDCCHs in a legacy CSS, or for EPDCCHs in an enhanced CSS 1110. The UE decoder may be, for example, as described in FIG. 3 with the following additional controller functions. If a UE is configured 1120 to perform decoding operations of PDCCHs for a DCI format with CRC scrambled by a TPC-RNTI, the UE may monitor a legacy CSS and not perform decoding operations of EPDCCHs in an enhanced CSS for such DCI format 1130. If a UE is configured to perform decoding operations of EPDCCHs for a DCI format with CRC scrambled by a TPC-RNTI, the UE may monitor an enhanced CSS and not perform decoding operations of PDCCHs in a legacy CSS for such DCI format 1140.

A size of the DCI format with CRC scrambled by a TPC-RNTI is designed to be same as a size of DCI formats with CRC scrambled by a C-RNTI that schedule PDSCH (DCI format 1A) or PUSCH (DCI format 0) when a network has little information about channel conditions that a UE is experiencing or, in general, when the network wants to provide the most robust and reliable detection for a PDSCH or a PUSCH. These DCI formats with CRC scrambled by a C-RNTI are the only formats transmitted in a CSS. By having a same DCI format size and differing only in the scrambling of a CRC (either by TPC-RNTI or by C-RNTI), a UE can determine with a single decoding operation whether any of these DCI formats was conveyed in a candidate PDCCH or EPDCCH. In order to avoid increasing a maximum number of decoding operations a UE needs to perform in a subframe, a UE may assume that the transmission of these DCI formats (with CRC scrambled by a TPC-RNTI or by a C-RNTI) is always in a same CSS (either legacy or enhanced) and that a UE does not perform additional decoding operations in another CSS to determine whether there was a DCI format with CRC scrambled by a C-RNTI transmitted to it.

A second exemplary embodiment of the invention considers transmission and detection processes for EPDCCHs when a number of REs available for Enhanced CCEs (ECCEs) per PRB varies across subframes.

A first consequence of variations across subframes in a number of REs per PRB for available transmissions of EPDCCHs is that an average number of EPDCCHs that can be supported may also vary as the respective resources vary. To reduce variations in an average number of EPDCCHs that can be transmitted per subframe, a UE can be configured with at least two sets of PRBs to monitor for potential EPDCCH transmissions depending on a number of respective REs available for EPDCCH transmissions per PRB. This number of REs may be different between distributed EPDCCH and localized EPDCCH transmissions (in case the PRBs for distributed EPDCCHs are not dynamically determined through the transmission of additional information, similar to the subframe symbols for PDCCH transmissions).

For example, when there are REs allocated for Channel State Information-Reference Signal (CSI-RS) transmission or for interference measurements in a subframe or when there are fewer subframe symbols for EPDCCH transmissions per subframe (in case the starting symbol of EPDCCH transmissions varies per subframe), a number of EPDCCH REs per PRB may be below a predetermined value and a UE may then consider a first set of PRBs for transmissions of EPDCCHs; otherwise, the UE may consider a second set of PRBs wherein the number of PRBs in the first set can be larger than the number of PRBs in the second set.

In a first exemplary method, a UE may dynamically determine (on a subframe basis) which set of PRBs (first set or second set) to consider for EPDCCH transmissions as a number of REs available for EPDCCH transmissions dynamically varies per PRB per subframe. For example, a UE may determine a starting subframe symbol for EPDCCH transmissions by detecting a channel transmitted in a first subframe symbol and informing a number of subframe symbols for a legacy DL control region. The UE may then consider a first set of PRBs for EPDCCH transmissions if a legacy DL control region spans 3 subframe symbols and a second set of PRBs for EPDCCH transmissions if the legacy DL control region spans 1 or 2 subframe symbols.

Figure 12:
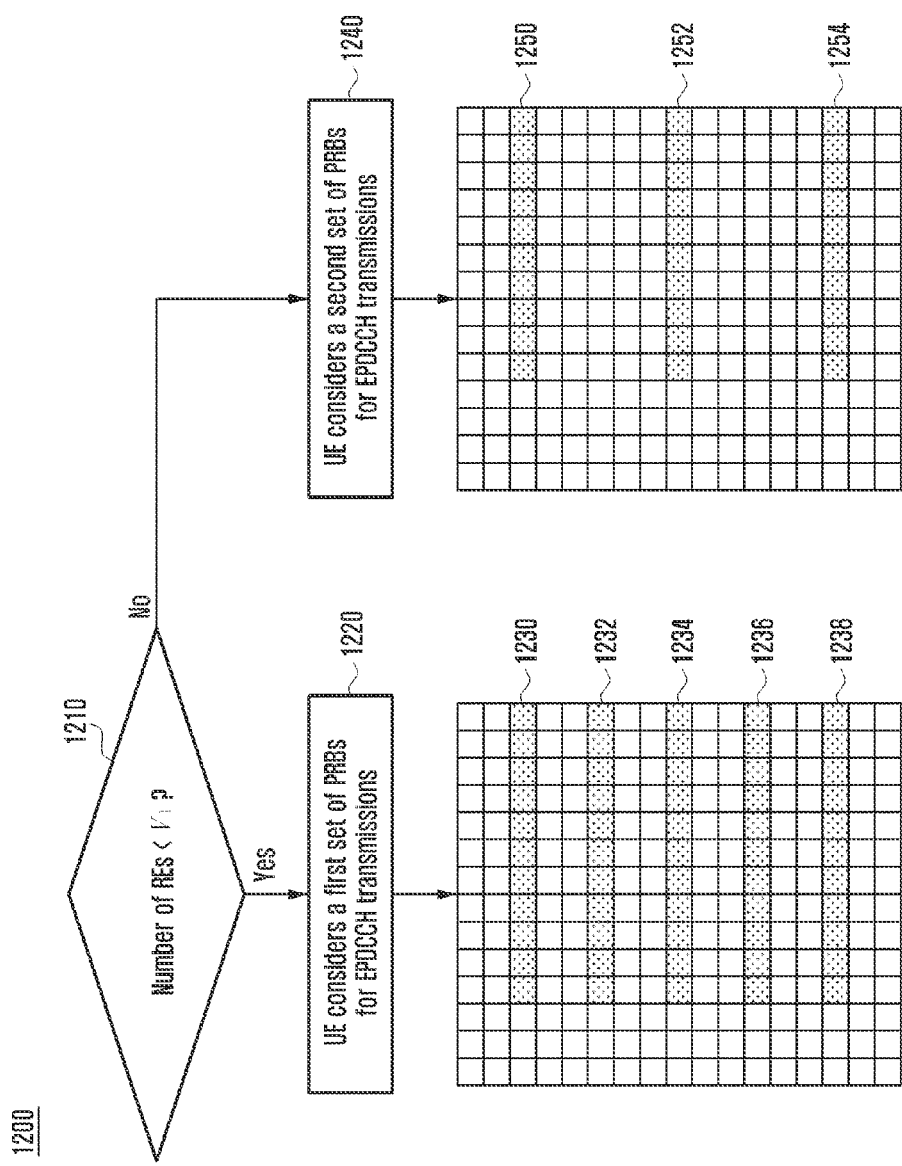
FIG. 12 is a diagram illustrating a process for using different sets of PRBs for EPDCCH transmissions in respectively different sets of subframes according to an exemplary embodiment of the present invention.

FIG. 12 is a diagram illustrating a process for using different sets of PRBs for EPDCCH transmissions in respectively different sets of subframes according to an exemplary embodiment of the present invention.

Referring to FIG. 12, in process 1200, a number of REs per PRB available for EPDCCH transmissions is compared to a predetermined value $V_1$ 1210. If this number of REs is smaller than $V_1$, a first set of PRBs 1220 consisting of a first number of PRBs 1230, 1232, 1234, 1236, 1238 is used for EPDCCH transmissions in the given subframe. Otherwise, if this number of REs is not smaller than $V_1$, a second set of PRBs 1240 consisting of a second number of PRBs 1250, 1252, 1254, 1256, 1258 is used for EPDCCH transmissions in the given subframe.

For EPDCCH transmissions there are additional implications from the variation in the available number of REs per PRB. If a variable ECCE size is used to maintain a same number of ECCEs per PRB, regardless of the number of REs in a PRB, the detection reliability of an EPDCCH corresponding to a given ECCE aggregation level also varies. For example, transmission of a DCI format using an EPDCCH consisting of one ECCE may be possible when the number of REs per ECCE has a first value but may not be possible when the number of REs per ECCE has a second (smaller) value as the code rate in the latter case may approach or even exceed one. If a same ECCE size is used, a number of ECCEs per PRB varies.

In a second exemplary method, to circumvent the above shortcoming either when an ECCE size is variable or when it is constant, a UE may be configured at least two sets of EPDCCH candidates for respective ECCE aggregation levels in at least two respective sets of subframes in order to achieve adaptation to variations in a number of REs for EPDCCH transmissions per PRB. For example, for $L_E \in \{1, 2, 4\}$ ECCEs, a first set of respective EPDCCH candidates $M_E^{(L_E)} \in \{M_E^{(1)}, M_E^{(2)}, M_E^{(4)}\}$ can be $M_E^{(L_E)} \in \{2,4,2\}$ if a number of REs per ECCE is smaller than a predetermined value and can be $M_E^{(L_E)} \in \{0,6,4\}$ otherwise.

Alternatively, in subframes where an average ECCE size for EPDCCH transmissions is below a predetermined value, some or all of the decoding operations for the smaller ECCE aggregation levels may be added to those for distributed EPDCCH transmissions. For example, a first set of EPDCCH candidates for localized EPDCCH transmissions may be $M_E^{(L_E)} \in \{2,4,2\}$ and a second set may be $M_E^{(L_E)} \in \{0,2,2\}$. The missing candidates can be allocated to distributed EPDCCH transmissions for which a respective first set of candidates can be $M_E^{(L_E)} \in \{2,2,2,2\}$ and a respective second set of candidates can be $M_E^{L_E} \in \{4,4,2,2\}$. As previously discussed for the case of the sets of configured PRBs for EPDCCH transmissions, a UE may dynamically determine (on a subframe basis) a set of EPDCCH candidates to consider in a subframe as a number of available REs per PRB per subframe also dynamically varies.

Figure 13:
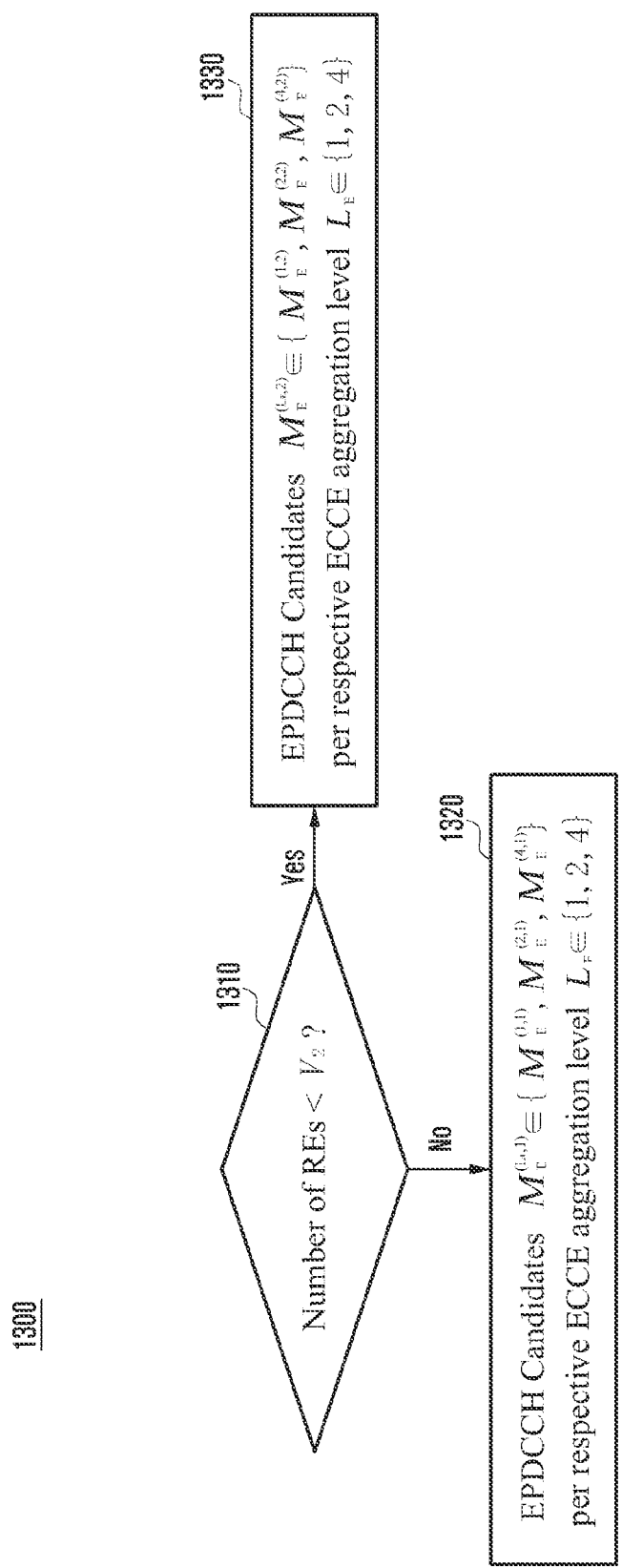
FIG. 13 is a diagram illustrating a process for a UE to determine a number of EPDCCH candidates for a respective ECCE aggregation level depending on a number of available Resource Elements (REs) per PRB according to an exemplary embodiment of the present invention.

FIG. 13 is a diagram illustrating a process for a UE to determine a number of EPDCCH candidates for a respective ECCE aggregation level depending on a number of available REs per PRB according to an exemplary embodiment of the present invention.

Referring to FIG. 13, in process 1300, a UE first compares a number of REs per PRB to a predetermined value $V_2$ 1310. If the number of REs per PRB is smaller than $V_2$, the UE considers EPDCCH candidates $M_E^{(L_E,1)} \in \{M_E^{(1,1)}, M_E^{(2,1)}, M_E^{(4,1)}\}$ for respective ECCE aggregation levels $L_E \in \{1,2,4\}$ 1320. Otherwise, the UE considers EPDCCH candidates $M_E^{(L_E,2)} \in \{M_E^{(1,2)}, M_E^{(2,2)}, M_E^{(4,2)}\}$ for respective ECCE aggregation levels $L_E \in \{1,2,4\}$ 1330. The above process is applicable regardless of whether an ECCE size varies per subframe while a number of ECCEs per PRB remains same or whether a number of ECCEs per PRB varies per subframe while an ECCE size remains same.

In a third exemplary method, to further increase the flexibility of EPDCCH transmissions, as an ECCE size per PRB varies, or as a number of ECCEs per PRB varies, PRB clusters may be used when a number of available REs for EPDCCH transmissions per PRB is smaller than a predetermined value. For example, if this number of REs is smaller than a predetermined value, a UE may consider that configured PRBs for EPDCCH transmissions are actually contiguous clusters of PRBs (for example, the additional PRBs can be symmetric relative to a configured PRB and start from the next PRB); otherwise, a UE may consider the configured PRBs with their nominal meaning (single PRBs). In case an EPDCCH transmission is over multiple adjacent PRBs, a multiplexing of ECCEs can remain as in the case an EPDCCH transmission is over a single PRB with the exception that each ECCE spans the same multiple of REs relative to the case of a single PRB. The same enhancement to the number of PRBs can be applied where a first set of PRBs is used when a number of available REs per PRB for EPDCCH transmissions has a first value (for example, when there is no CSI-RS transmission or the legacy DL control region has a first size assuming that a UE determines this size every subframe) and a second (larger) set of PRBs is used when a number of available REs per PRB for EPDCCH transmissions has a second (smaller) value (there is CSI-RS transmission or the legacy DL control region has a second size larger than the first size). This is because the number of REs per PRB that is available for EPDCCH transmissions decreases when there is CSI-RS transmission of when the legacy DL control region has a larger size and this decrease can be compensated by proportionally increasing the number respective RBs.

Figure 14:
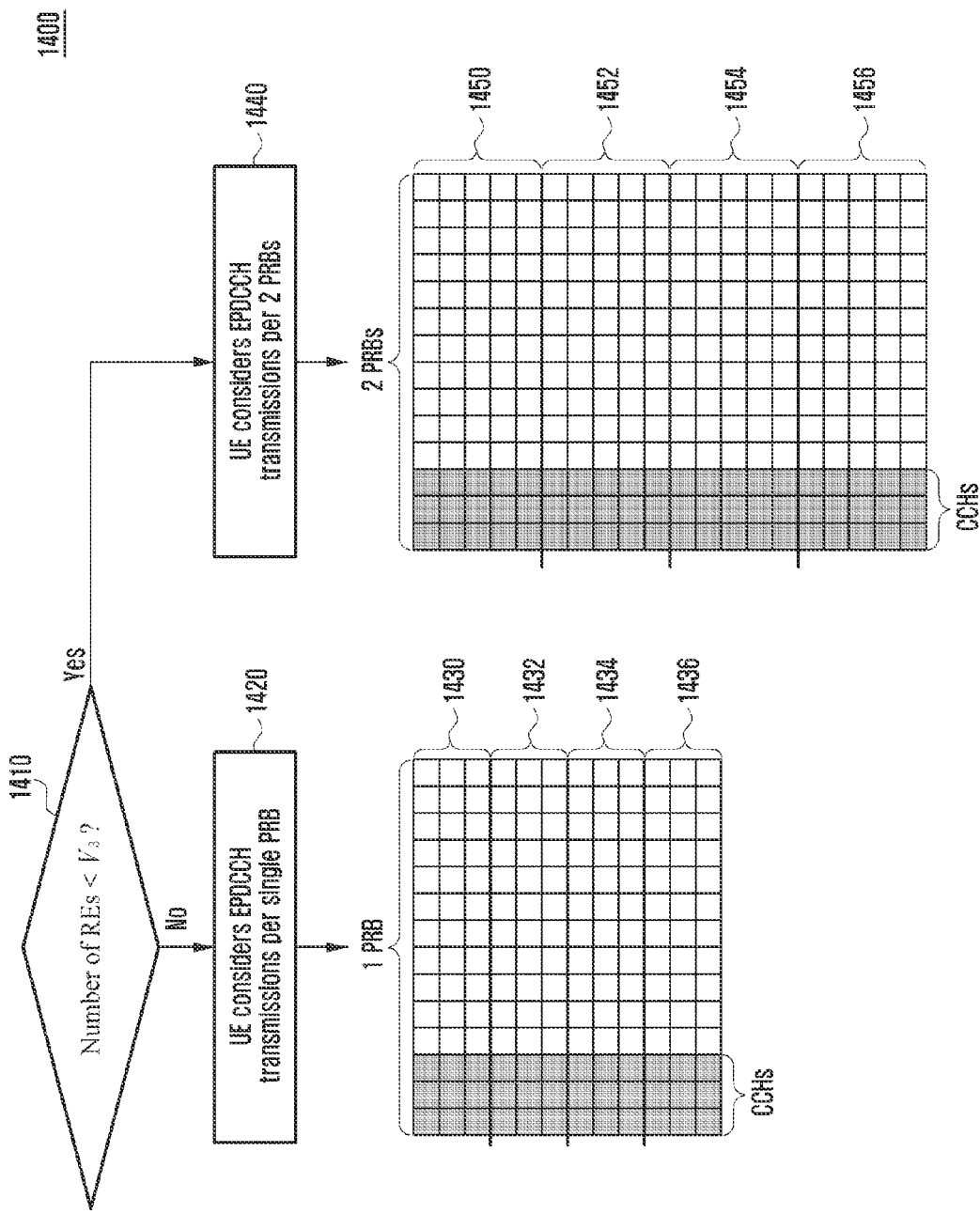
FIG. 14 illustrates a process for a UE to determine a number of PRBs used for EPDCCH transmissions and an allocation of ECCEs depending on a number of available REs per PRB for EPDCCH transmissions according to an exemplary embodiment of the present invention.

FIG. 14 illustrates a process for a UE to determine a number of PRBs used for EPDCCH transmissions and an allocation of ECCEs depending on a number of available REs per PRB for EPDCCH transmissions according to an exemplary embodiment of the present invention.

Referring to FIG. 14, in process 1400, a UE first compares a number of REs per PRB to a predetermined value $V_3$ 1410. If the number of REs per PRB is not smaller than $V_3$, the UE may consider localized EPDCCH transmissions per single PRB per subframe 1420. Without explicitly illustrating the REs for CRS/DMRS/CSI-RS or transmissions of other signals, there are 4 ECCEs per PRB 1430, 1432, 1434, 1436. Otherwise, if the number of REs per PRB is smaller than $V_3$, the UE may consider localized EPDCCH transmissions per two PRBs 1440 and there are 2 ECCEs per PRB. The number and structure of ECCEs 1450, 1452, 1454, 1456 may be the same as in the case of EPDDCHs that are transmitted per PRB, but each ECCE spans twice the number of REs.

In the previous three exemplary methods, the respective predetermined values may be either signaled to a UE by the NodeB, or may be determined by the UE based on the number of information bits (payload) for each DCI format that the UE is configured to decode. For example, for the third exemplary embodiment, the number of REs per PRB may be adequate for a payload of a first DCI format, but may not be adequate for a payload of a second DCI format. The predetermined value may be a code rate achievable for a respective DCI format transmission over a reference number of ECCEs such as 1 ECCE. A UE may then consider a single PRB in the former case and consider a cluster of two PRBs in the latter case.

The previous three exemplary methods may also be combined. For example, for the second and third methods, when a UE determines (based on a number of REs in a PRB for EPDCCH transmissions) that localized EPDCCH transmissions are over a single PRB (4 ECCEs per PRB), it may also consider a first set of EPDCCH candidates for a first set of ECCE aggregation levels while when it determines that localized EPDCCH transmissions are over 2 PRBs (2 ECCEs per PRB), and it may consider a second set of EPDCCH candidates for a second set of ECCE aggregation levels.

The description for each of the previous three methods is made with respect to a UE determining on a subframe basis a condition based on which it determines a parameter set to apply for detections of EPDCCHs. However, each of the previous three methods may also apply in case in which a UE does not determine on a subframe basis the parameters affecting that condition, such as, for example, if a UE does not determine a size of the legacy DL control region per subframe. In such case, a parameter set for a respective method may be configured to the UE by a NodeB through higher layer signaling. For example, if a UE is configured to assume a legacy DL control region size of 1 or 2 subframe symbols, a first set of parameters is also implicitly configured for a respective method (such as a single PRB in case of the third method) while if a UE is configured to assume a legacy DL control region size of 3 subframe symbols, a second set of parameters is implicitly configured for the respective method (such as a cluster of 2 PRBs in case of the third method). The configuration can also be dependent on the subframe. For example, in a subframe with no CSI-RS transmission, a first set of parameters can be configured for a respective method; otherwise, a second set of parameters can be configured for a respective method.

Figure 15:
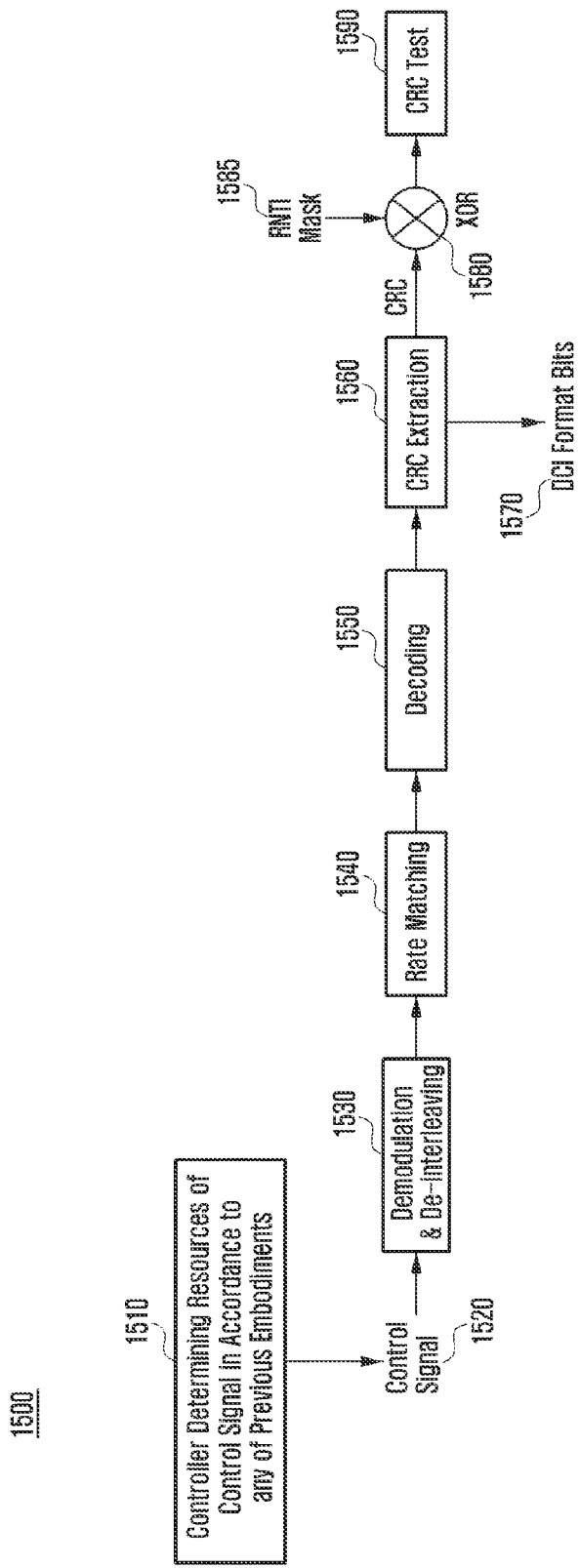
FIG. 15 illustrates a UE decoder for detecting a DCI format conveyed by an EPDCCH in accordance to one or more conditions including a number of PRBs that can be used for EPDCCH transmissions, a number of candidates per ECCE aggregation level, or a number of PRBs in a cluster of PRBs used for EPDCCH transmissions according to an exemplary embodiment of the present invention.

FIG. 15 illustrates a UE decoder for detecting a DCI format conveyed by an EPDCCH in accordance to one or more conditions including a number of PRBs that can be used for EPDCCH transmissions, a number of candidates per ECCE aggregation level, or a number of PRBs in a cluster of PRBs used for EPDCCH transmissions according to an exemplary embodiment of the present invention.

Referring to FIG. 15, in process 1500, a UE first determines a number of PRBs, a number of EPDCCH candidates per ECCE aggregation level, or a number of PRBs in a cluster of PRBs used for an EPDCCH transmission 1510. This determination may be performed by the UE, or may be configured by a NodeB through higher layer signaling. Once the UE determines the resources (PRBs) for EPDCCH transmissions or the number of candidates per respective ECCE aggregation level, a received control signal in a candidate EPDCCH 1520 is demodulated, resulting bits are de-interleaved 1530, a rate matching applied at a NodeB transmitter is restored 1540, and data is subsequently decoded 1550. After decoding, DCI format bits 1570 are obtained after extracting CRC bits 1560 which are then de-masked 1580 by applying an XOR operation with a RNTI 1585 corresponding to the DCI format. Finally, the UE performs a CRC test 1590. If the CRC test passes, the UE considers the DCI format as a valid one and determines the parameters for signal reception in a PDSCH or signal transmission in a PUSCH. If the CRC test does not pass, the UE disregards the presumed DCI format.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for a wireless communication, the method comprising:
receiving a bitmap associated with a plurality of subframes, wherein a bit of the bitmap indicates whether a user equipment (UE) monitors a first type of a physical downlink control channel (PDCCH) in a subframe corresponding to the bit among the plurality of subframes or not;
monitoring a second type of a PDCCH in a common search space (CSS) regardless of the bitmap to acquire second downlink control information (DCI); and
monitoring the first type of the PDCCH or the second type of the PDCCH in a UE-dedicated search space (UE-DSS) in the subframe based on the bitmap to acquire first DCI,
wherein the second DCI comprises common information, and the first DCI comprises dedicated information for the UE, and wherein the first type of the PDCCH is enhanced PDCCH (ePDCCH), and the second type of the PDCCH is PDCCH.

2. The method of claim 1, wherein a size of the bitmap corresponds to a number of the plurality of subframes.

3. The method of claim 1, wherein transmission of the first type of the PDCCH in the subframe is over a subset of an operating bandwidth and over all symbols of the subframe starting after at most a predetermined number of symbols from a beginning of the subframe, and transmission of the second type of the PDCCH is over the operating bandwidth and over at most the predetermined number of symbols in the subframe starting from the beginning of the subframe.

4. A method for a wireless communication system, the method comprising:
   transmitting a bitmap associated with a plurality of subframes, wherein a bit of the bitmap indicates whether a user equipment (UE) monitors a first type of a physical downlink control channel (PDCCH) in a subframe corresponding to the bit among the plurality of subframes or not;
   transmitting second downlink control information (DCI) on a second type of a PDCCH in a common search space (CSS) regardless of the bitmap; and
   transmitting first DCI on the first type of the PDCCH or the second type of the PDCCH in a UE-dedicated search space (UE-DSS) in the subframe based on the bitmap,
   wherein the second DCI comprises common information, and the first DCI comprises dedicated information for the UE, and
   wherein the first type of the PDCCH is enhanced PDCCH (ePDCCH), and the second type of the PDCCH is PDCCH.

5. The method of claim 4, wherein a size of the bitmap corresponds to a number of the plurality of subframes.

6. The method of claim 4, wherein transmission of the first type of the PDCCH in the subframe is over a subset of an operating bandwidth and over all symbols of the subframe starting after at most a predetermined number of symbols from a beginning of the subframe, and transmission of the second type of the PDCCH is over the operating bandwidth and over at most the predetermined number of symbols in the subframe starting from the beginning of the subframe.

7. A user equipment (UE) for a wireless communication, the UE comprising:
   a transceiver to transmit and receive signals to and from a base station; and
   a processor configured to:
   control to receive a bitmap associated with a plurality of subframes, wherein a bit of the bitmap indicates whether the user equipment (UE) monitors a first type of a physical downlink control channel (PDCCH) in a subframe corresponding to the bit among the plurality of subframes or not,
   monitor a second type of a PDCCH in a common search space (CSS) regardless of the bitmap to acquire second downlink control information (DCI), and
   monitor the first type of the PDCCH or the second type of the PDCCH in a UE-dedicated search space (UE-DSS) in the subframe based on the bitmap to acquire first DCI,
   wherein the second DCI comprises common information, and the first DCI comprises dedicated information for the UE, and
   wherein the first type of the PDCCH is enhanced PDCCH (ePDCCH), and the second type of the PDCCH is PDCCH.

8. The UE of claim 7, wherein a size of the bitmap corresponds to a number of the plurality of subframes.

9. The UE of claim 7, wherein transmission of the first type of the PDCCH in the subframe is over a subset of an operating bandwidth and over all symbols of the subframe starting after at most a predetermined number of symbols from a beginning of the subframe, and transmission of the second type of the PDCCH is over the operating bandwidth and over at most the predetermined number of symbols in the subframe starting from the beginning of the subframe.

10. A base station for a wireless communication, the base station comprising:
    a transceiver to transmit and receive signals to and from a user equipment (UE); and
    a processor configured to:
    control to transmit a bitmap associated with a plurality of subframes,
    transmit second downlink control information (DCI) on a second type of a PDCCH in a common search space (CSS) regardless of the bitmap, and
    transmit first DCI on a first type of the PDCCH or the second type of the PDCCH in a UE-dedicated search space (UE-DSS) in the subframe based on the bitmap,
    wherein a bit of the bitmap indicates whether the user equipment (UE) monitors the first type of a physical downlink control channel (PDCCH) in a subframe corresponding to the bit among the plurality of subframes or not,
    wherein the second DCI comprises common information, and the first DCI comprises dedicated information for the UE, and
    wherein the first type of the PDCCH is enhanced PDCCH (ePDCCH), and the second type of the PDCCH is PDCCH.

11. The base station of claim 10, wherein a size of the bitmap corresponds to a number of the plurality of subframes.

12. The base station of claim 10, wherein transmission of the first type of the PDCCH in the subframe is over a subset of an operating bandwidth and over all symbols of the subframe starting after at most a predetermined number of symbols from a beginning of the subframe, and transmission of the second type of the PDCCH is over the operating bandwidth and over at most the predetermined number of symbols in the subframe starting from the beginning of the subframe.

* * * * *